(12) United States Patent
Bay et al.

(10) Patent No.: US 11,715,069 B2
(45) Date of Patent: Aug. 1, 2023

(54) CHAT AND EMAIL MESSAGING INTEGRATION

(71) Applicant: Workstorm.com LLC, Chicago, IL (US)

(72) Inventors: Jeffery Bay, Austin, TX (US); Anatoliy Yudovich, Riverwoods, IL (US); Nicholas Stech, Chicago, IL (US); Adrian Miller, Oroville, CA (US); Raj Fernando, Chicago, IL (US)

(73) Assignee: WORKSTORM.COM LLC, Chicago, IL (US)

( * ) Notice: Subject to any disclaimer, the term of this patent is extended or adjusted under 35 U.S.C. 154(b) by 0 days.

(21) Appl. No.: 17/165,090

(22) Filed: Feb. 2, 2021

(65) Prior Publication Data

US 2021/0295269 A1 Sep. 23, 2021

Related U.S. Application Data

(63) Continuation of application No. 15/914,319, filed on Mar. 7, 2018, now Pat. No. 10,915,866.

(60) Provisional application No. 62/524,101, filed on Jun. 23, 2017, provisional application No. 62/468,818, filed on Mar. 8, 2017.

(51) Int. Cl.
| | |
|---|---|
| *G06Q 10/107* | (2023.01) |
| *H04L 51/046* | (2022.01) |
| *H04L 51/42* | (2022.01) |
| *H04L 51/48* | (2022.01) |
| *H04L 51/56* | (2022.01) |
| *H04L 51/224* | (2022.01) |

(52) U.S. Cl.
CPC ......... *G06Q 10/107* (2013.01); *H04L 51/046* (2013.01); *H04L 51/42* (2022.05); *H04L 51/48* (2022.05); *H04L 51/56* (2022.05); *H04L 51/224* (2022.05)

(58) Field of Classification Search
CPC ..... G06Q 10/107; H04L 51/046; H04L 51/22; H04L 51/28; H04L 51/36; H04L 51/24; H04L 51/42; H04L 51/48; H04L 51/56; H04L 51/224
See application file for complete search history.

(56) References Cited

U.S. PATENT DOCUMENTS

| | | |
|---|---|---|
| 7,583,793 B2 | 9/2009 | Jacovi et al. |
| 2003/0101343 A1 | 5/2003 | Eaton et al. |
| 2005/0108329 A1 | 5/2005 | Weaver et al. |
| 2005/0198168 A1 | 9/2005 | Marston et al. |
| 2007/0226299 A1 | 9/2007 | Shaffer et al. |
| 2008/0046807 A1 | 2/2008 | Margitich et al. |

(Continued)

*Primary Examiner* — Adil Ocak
(74) *Attorney, Agent, or Firm* — Sterne, Kessler, Goldstein & Fox P.L.L.C.

(57) ABSTRACT

Disclosed herein are system, method, and computer program product embodiments for delivering and receiving messages. An embodiment operates by allowing users to subscribe to various chat panels of a messaging system. Users will be able to utilize the chat panels to send and receive messages. In a corporate context, an administrator may be able to quickly send unidirectional messages to employees as well as assign users to mandatory divisions based on job function. In an embodiment, the messaging system also allows for email integration and graphical user interface workspace configuration.

20 Claims, 34 Drawing Sheets

(56) References Cited

U.S. PATENT DOCUMENTS

| | | | |
|---|---|---|---|
| 2012/0159349 A1* | 6/2012 | Kansky | G06F 3/0481 |
| | | | 715/752 |
| 2015/0012448 A1* | 1/2015 | Bleiweiss | G06F 40/289 |
| | | | 705/311 |
| 2015/0293764 A1 | 10/2015 | Visvanathan | |
| 2015/0302103 A1* | 10/2015 | Jeremias | G06F 3/04842 |
| | | | 715/758 |
| 2016/0148105 A1 | 5/2016 | Henmi et al. | |
| 2016/0234135 A1* | 8/2016 | Kim | H04L 51/08 |
| 2017/0171121 A1* | 6/2017 | Zhang | H04L 51/066 |

\* cited by examiner

Scoutahead

↑ ↔ ⚲

Test for Andy ☆
Test for Joe ★
Zoom Rooms ☆
team test for Ilya ☆
test for Tom on Tuesday ☆
Test for ethan ☆
Test for nick ☆
⬡ Poker

⊕

👤 PRIVATE MESSAGES
User A ☆
User B ☆
User C ☆
User D ☆
User E ☆
User F ☆
User G ☆
User H ☆
User I ☆
User J ☆

↑Home ☐Surveys ↑Admin

Surveys

[ Create ]  ——1210

SURVEYS TO TAKE [1]

test 2 for andy
Participants: 5
Results: Admin Only
Administrator(s): User A

SURVEYS [4]

Surveys you can ☐ View Only ☐ Edit and view

⎱
⎰ 1220

Search surveys

Nick Stech 11/01/2016
demo survey

M L 10/27/2016
October 31 – Pizza Options

Scoutahead

↑ Home ☐ Surveys¹ T Admin

★
⊕
■ COMPANY ★
⊕ DIVISION ★
Accounting ☆
Developers ☆
IT ★
Marketing ★
QA ⊕
Sales ☆
⊍ TEAMS ☆
General Dev Chat ☆
Giphy test team ☆
HQ ★
Officers ☆
Team One ☆
Test for Andy
Test for Joe
Zoom Rooms
team test for Ilya

DIVISIONS

Developers

Enter Name or Email    ☐ Upload List

} 1310    ☐ Save

A  User A
   Member

B  User B
   Member

C  User C
   Member

D  User D
   Member

E  User E
   Member

*Scoutahead*

⌂ ⌵ ⚲

★ COMPANY
⊕
⎇ DIVISION
★ Accounting
★ Developers
☆ IT
☆ Marketing
★ QA
★ Sales
⊕
👥 TEAMS
☆ General Dev Chat
☆ Giphy test team
☆ HQ
☆ Officers
★ Team One
☆ Test for Andy
★ Test for Joe
☆ Zoom Rooms

1400

⌂ Home ☐ Surveys¹ ⊤ Admin

Manage Company  1410

Name
[ Scoutahead ]

Email Domain Names (comma separated)
[ scoutahead.com, thechoppergroup.com ]

*Scoutahead*

Zoom: + −

1430

Manage Site Admins

[ Add Administrators ]  1440

A User A  1420
B User B
C User C
D User D

FIG. 14

Scoutahead

↑ Home  ☐ Surveys  ↑ Admin

1500

1510

★ COMPANY

⌂ SCOUTAHEAD → ★

| | |
|---|---|
| A | User A 10/26/2016 3:55 pm<br>Welcome to Scoutahead! |
| A | User A 11/12/2016 3:29 pm<br>The whole company will see this. |
| A | User A 11/24/2016 1:23 pm<br>Have a Happy Thanksgiving everyone! Thanks for all your hard work! Scoutahead is amazing and ⚠ |

Scoutahead

⋔ DIVISION  ⊕

Accounting ★
Developers ★
IT ☆
Marketing ★
QA ★
Sales ★

⚞ QA → ★

| | |
|---|---|
| B | User B 10/23/2016 8:29 pm<br>Welcome to QA |
| A | User A 10/23/2016 8:52 pm<br>Once I refresh then i speak after i'm made admin. |
| A | User A 10/23/2016 9:05 pm<br>Great job guys! |

QA

⨆ TEAMS  ⊕

General Dev Chat ☆
Giphy test team ☆
HQ ☆
Officers ☆
Team One ☆
Test for Andy ★
Test for Joe ☆
Zoom Rooms ☆
team test for Ilya ☆

Contacts

User B
B  User B
    coo

⚞ ACCOUNTING

| | |
|---|---|
| A | User A 11/01/2016 1:41 pm<br>hEY WE HAVE A MEETING N MONDAY AT 3. |
| B | User B 11/15/2016 12:48 pm<br>Test |
| A | User A 11/21/2016 8:04 am<br>everyone in accounting will s real time. |

Accounting

⚞ SALES

| | |
|---|---|
| A | User A 10/25/2016 4:5 pm<br>this is the sales group |

Sales

*FIG. 15*

Scoutahead

⌂ ☰ 👤

| | |
|---|---|
| ☆ | Test for Andy |
| ★ | Test for Joe |
| ☆ | Zoom Rooms |
| ☆ | team test for Ilya |
| ☆ | test for Tom on Tuesday |
| ☆ | Test for ethan |
| ☆ | Test for nick |
| ⊕ | ⊘ Poker |

👤 PRIVATE MESSAGES

☆ User A
☆ User B
☆ User C
☆ User D
☆ User E
☆ User F
☆ User G
☆ User H
☆ User I
☆ User J

⌂Home  ☐Surveys¹  ▼Admin

User A                                                    1800
                                         ⚙ 🔲 ✕ §
                                         ○ Turn notifications on
                                         ⊙ Leave
                                                   1810

| | |
|---|---|
| I | User I 11/17/2016 3:58 pm |
| | Zoom sounds promising. Skype may be too, but requires dealing with a Microsoft. |
| A | User A 11/16/2016 4:30 am |
| | Saw this yesterday. Microsoft may be changing: https://www.linuxfoundation.org/announcements/microsoft-fortifies-commitment-to-open-source-becomes-linux-foundation-platinum |
| A | User A 11/16/2016 10:39 am |
| | We're working on the App today–Google and Apple–you'll probably hear from Adrian or Andrew regarding new pics so that we can deploy our apps |
| A | User A 11/16/2016 10:39 am |
| | or might want to reach out to them soon |
| I | User I 11/16/2016 10:48 am |
| | Okay, I just got a notification from GoNative that our app is ready. |
| I | User I 11/16/2016 10:48 am |
| | And working with joey on the screenshots |
| A | User A 11/16/2016 1:57 pm |
| | Urgent messages |
| A | User A 11/16/2016 2:01 pm |
| | Test |
| A | User A 11/16/2016 2:01 pm |
| | Test2 |

1820

Nick Stech                                              ◁ ◯ ▷

*Scoutahead*

FIG. 18

CHAT AND EMAIL MESSAGING INTEGRATION

CROSS-REFERENCE TO RELATED APPLICATIONS

This application is a continuation of U.S. patent application Ser. No. 15/914,319, filed Mar. 7, 2018, which claims priority to U.S. Provisional Patent Application No. 62/524, 101, filed Jun. 23, 2017, and U.S. Provisional Patent Application No. 62/468,818, filed Mar. 8, 2017, the entireties of which are incorporated herein by reference.

BACKGROUND

In industry, employees communicate on a fast-paced and high-volume basis. Often, this communication takes written form, either to pass a message or to deliver documents or other types of information. To facilitate messaging, employees may, for example, communicate via email or instant messaging.

As the demands of the workplace evolve, however, employees must communicate even more quickly to efficiently transfer information. Long email chains become burdensome. Often, when a single message is sent to multiple parties, a flood of return messages may result. Information may become lost, especially in a large business organization context. Instant messaging also fails to properly capture the archival capabilities of email. This failure becomes especially problematic for the regulatory compliance. Further, existing systems often lack the capability to highlight urgent or important messages in a meaningful manner to properly alert employees.

Additionally, management of effective message delivery to users has become more complex as users become more mobile and utilize multiple devices. Categorizing and delivering messages while interfacing several devices has generated difficulties regarding message delivery optimization.

Systems and methods are needed to more effectively deliver messages within an organization.

BRIEF DESCRIPTION OF THE DRAWINGS

The accompanying drawings, which are incorporated herein and form a part of the specification, illustrate the present disclosure and, together with the description, further serve to explain the principles of the disclosure and to enable a person skilled in the relevant art to make and use the disclosure.

FIG. 12 is a diagram that illustrates a graphical user interface for survey access, according to an embodiment.

FIG. 13 is a diagram that illustrates a graphical user interface for customizing members of a division, according to an embodiment.

FIG. 14 is a diagram that illustrates a graphical user interface for customizing the display of the graphical user interface, according to an embodiment.

FIG. 15 is a diagram that illustrates a graphical user interface for managing contacts, according to an embodiment.

FIG. 18 is a diagram that illustrates a graphical user interface for toggling notifications, according to an embodiment.

Figure 1A:
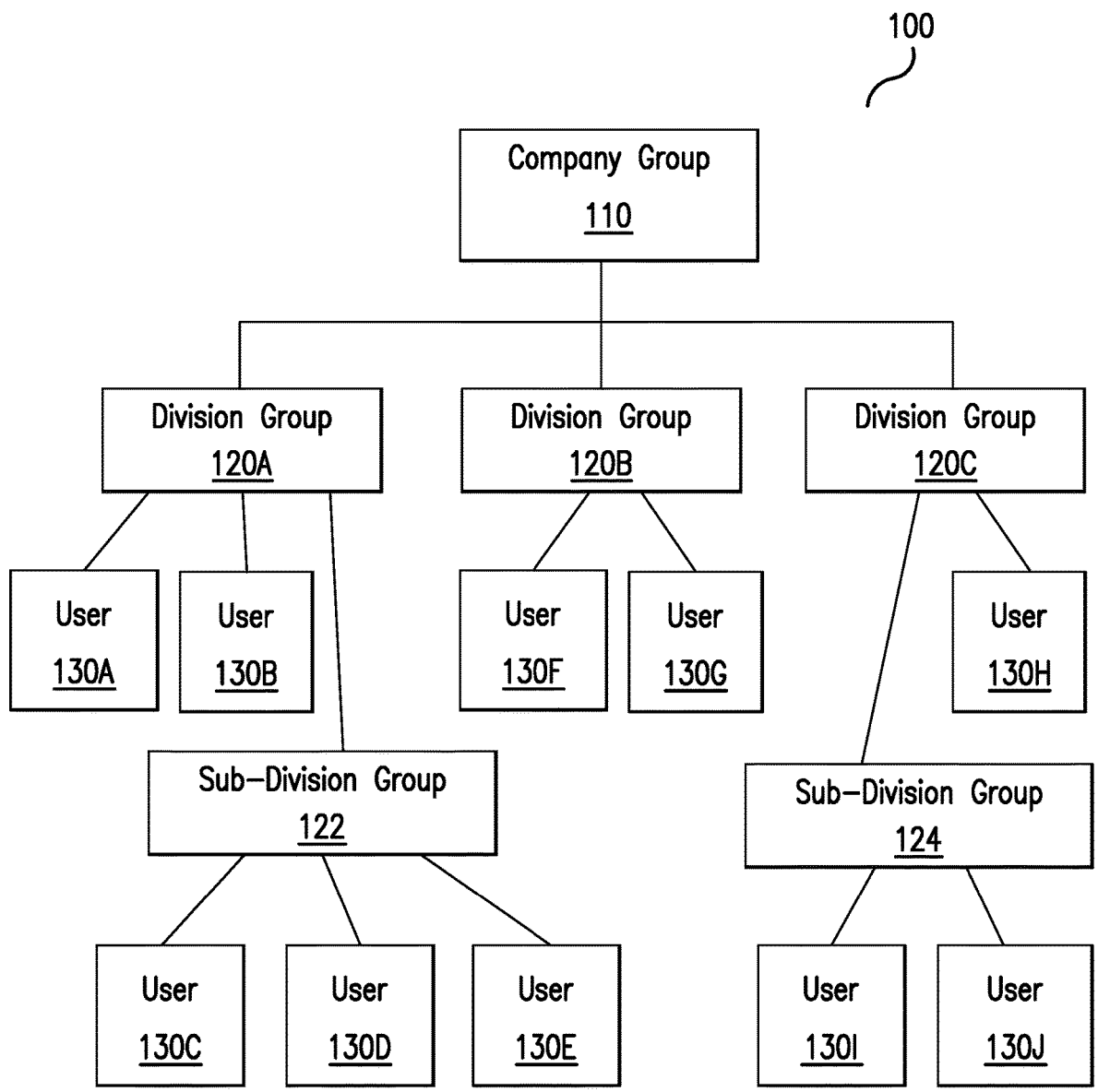
FIG. 1A is a block diagram of a hierarchical messaging configuration, according to an embodiment.

Generally, the left-most digit(s) of a reference number identifies the drawing in which the reference number first appears.

DETAILED DESCRIPTION

Provided herein is a hierarchical system that allows for instant messaging combined with the archival features of email.

In an embodiment, hierarchical cross-platform messaging allows a "top-down" type of communication to highlight urgent messages and alerts. Administrators or senior-level employees may be able to quickly send direct messages to junior-level employees on a larger scale without inviting a flood of return messages. Administrators or senior-level employees may quickly send these messages using a chat-like interface that delivers the message in real-time.

In an embodiment, employees may be grouped into "divisions" or working groups based on department, project, title, or task. An employee may be added or removed to the division. Employees within the division will then be able to receive messages from administrators of that division.

In an embodiment, hierarchical cross-platform messaging allows employees to create their own messaging groups, or teams, for communication. These teams may exists independently of divisions and may be customized.

In an embodiment, hierarchical cross-platform messaging utilizes a messaging system implemented using Internet-based components, such as web servers and databases. For example, users will not need to install an application on a user device to access the messaging system. The messaging system will instantiate chat panels as well as provide an interface with user client devices, such as computers, laptops, or tablets.

In an embodiment, hierarchical cross-platform messaging includes an integration of chat features with electronic mail features. For example, users utilizing the messaging system may receive chat messages as well as emails that are displayed in a single chat interface. This features allows integration of email features within a chat context, allowing users to communicate with individuals who may not have access to the chat features of a messaging system. The message system may receive emails, parse received emails, and reorganize the emails to be displayed along with chat panels in a graphical user interface.

For illustrative purposes, embodiments disclosed herein may be described with reference to a business organization but may also be used in other organizations as well. For example, the embodiments disclosed herein may be used in schools, universities, trade associations, clubs, etc. The embodiments may also be used in the regulatory context in situations such as regulatory compliance or e-discovery.

Figure 1B:
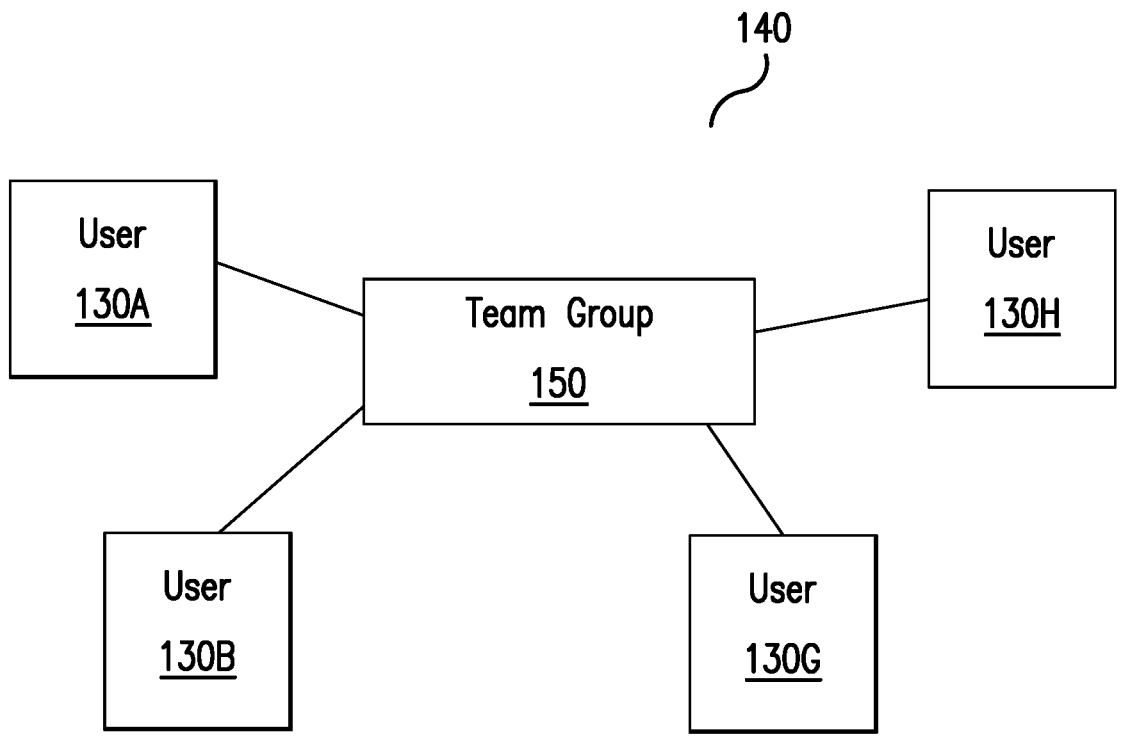
FIG. 1B is a block diagram of a team group messaging configuration, according to an embodiment.
Figure 1C:
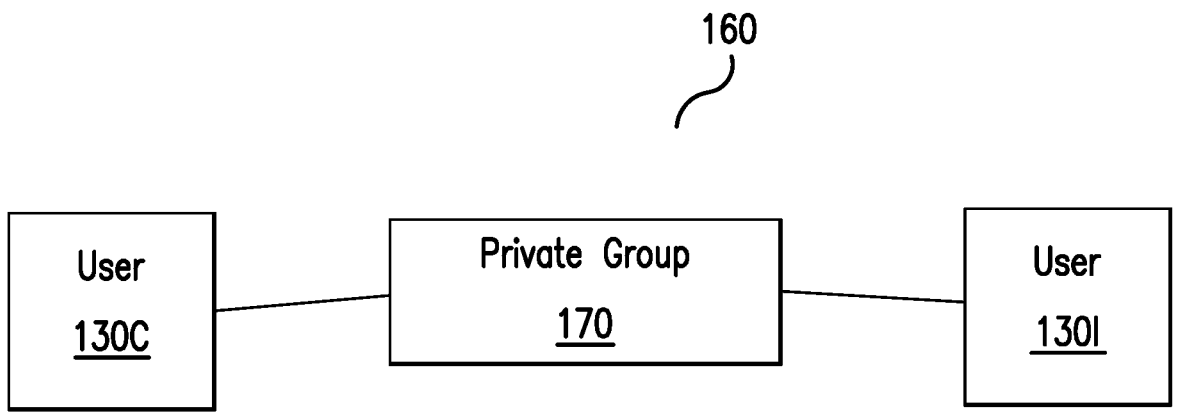
FIG. 1C is a block diagram of a private group messaging configuration, according to an embodiment.
Figure 2A:
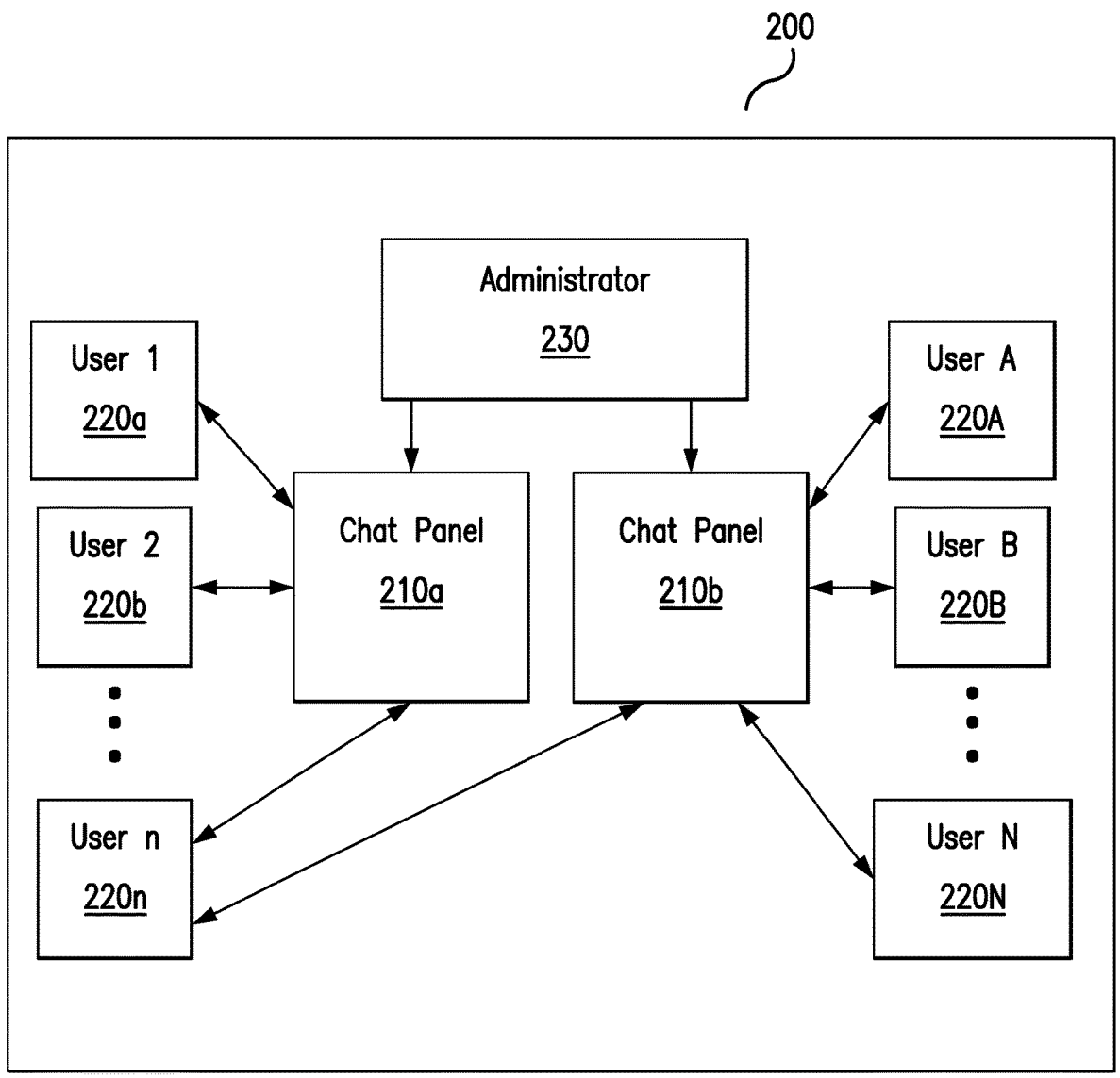
FIG. 2A is a block diagram of a messaging system highlighting team messaging, according to an embodiment.
Figure 2B:
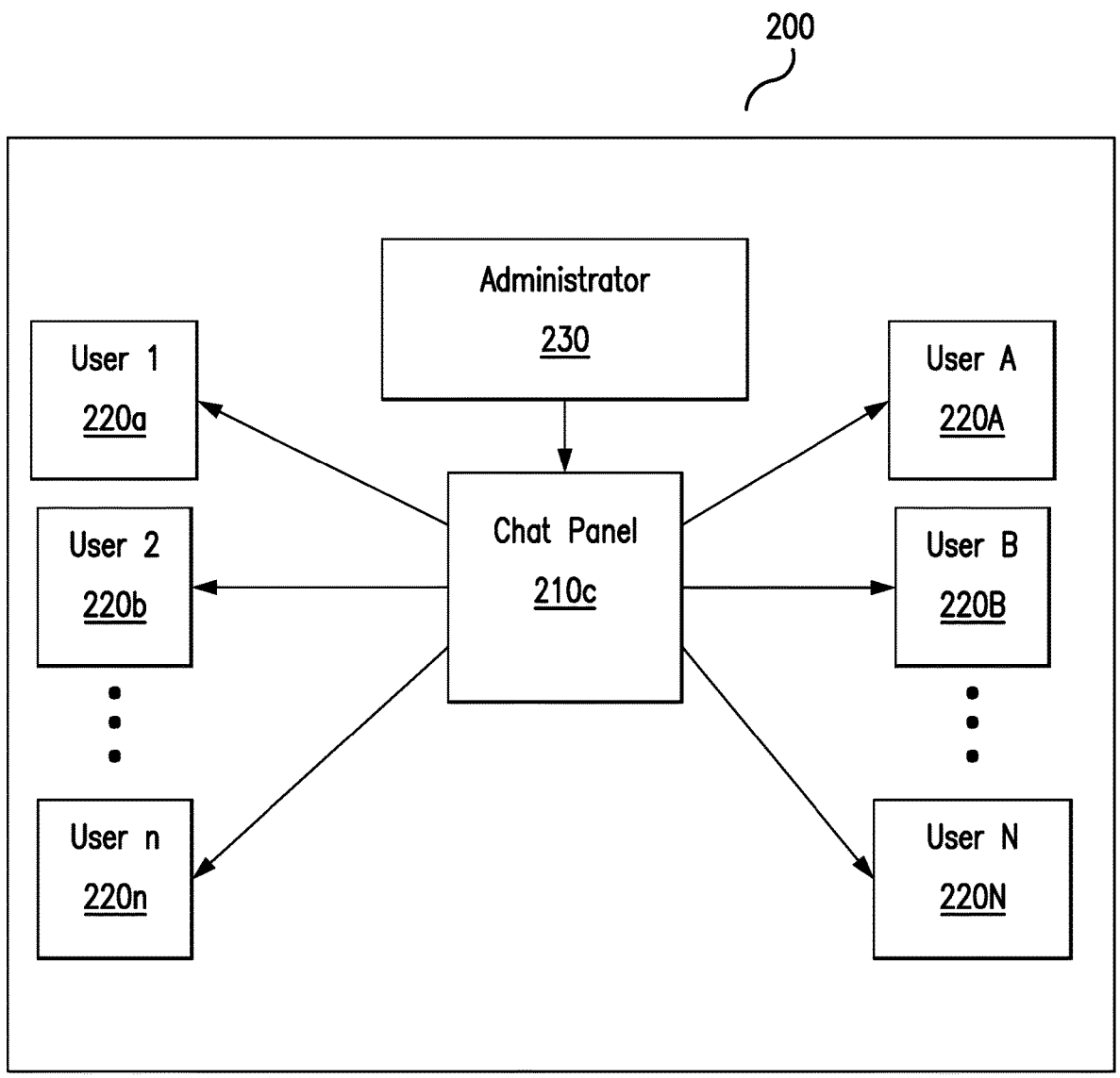
FIG. 2B is a block diagram of a messaging system highlighting organization-wide messaging and division messaging, according to an embodiment.
Figure 3:
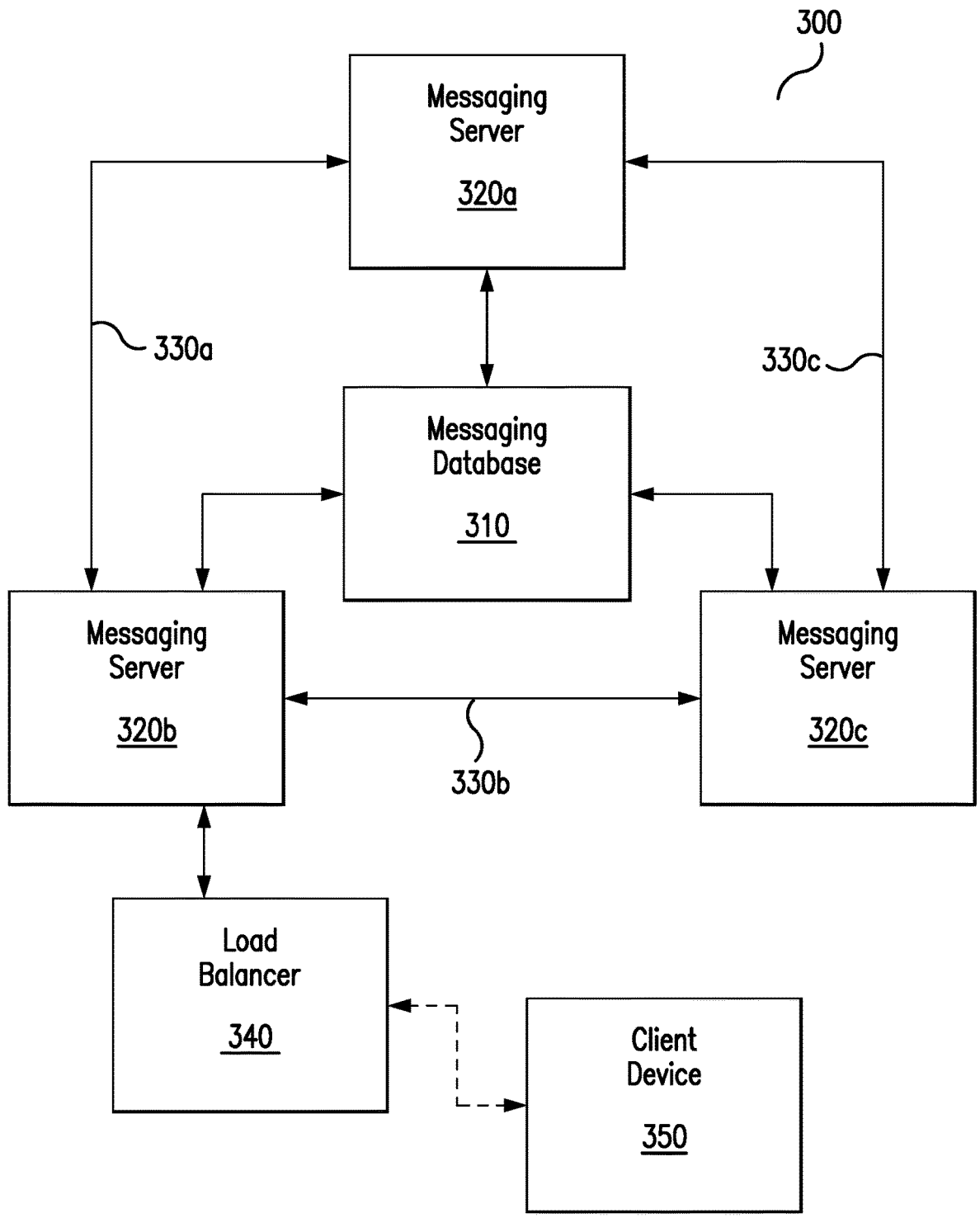
FIG. 3 is a block diagram of messaging system hardware, according to an embodiment.
Figure 4:
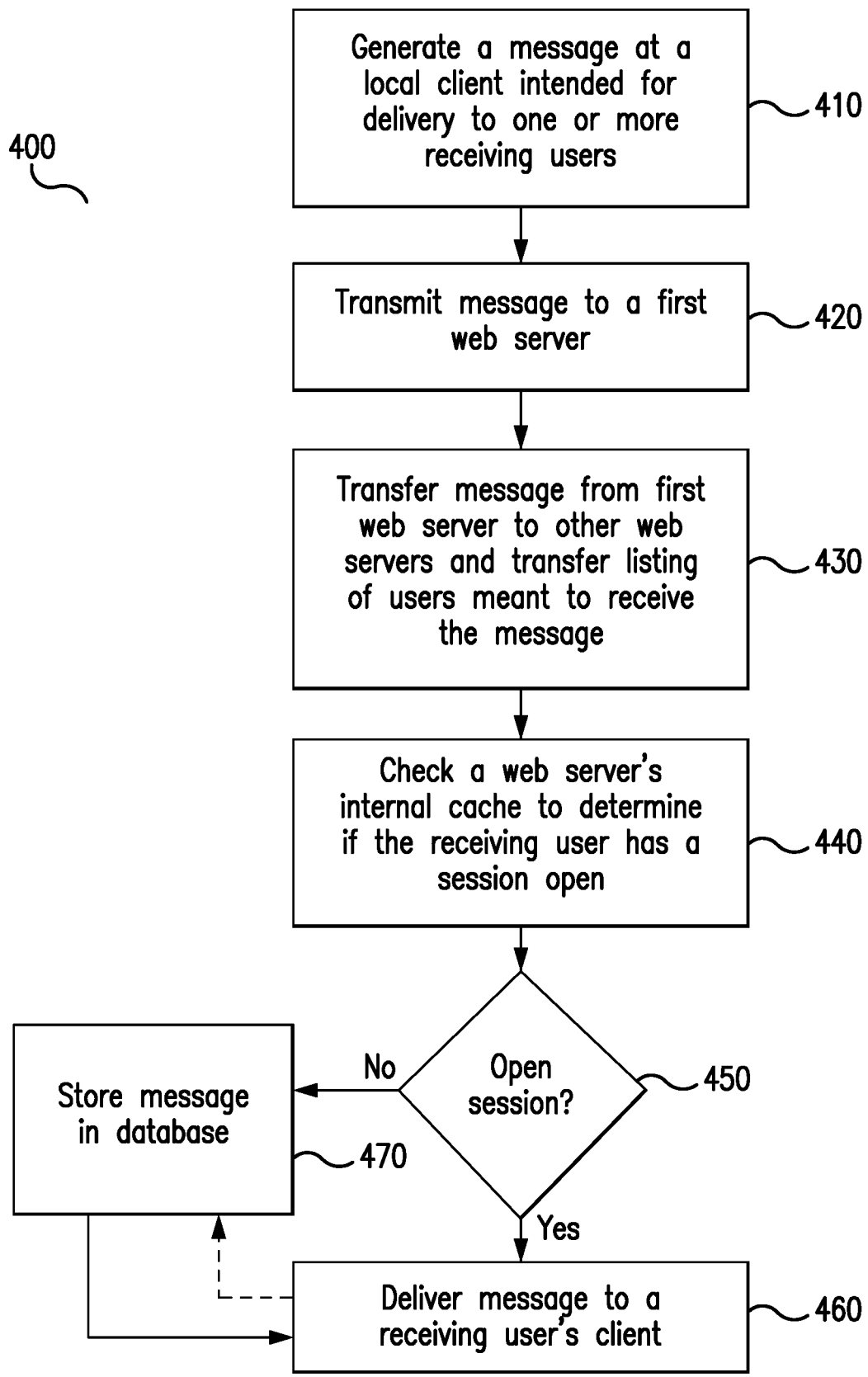
FIG. 4 is a flowchart that illustrates a method for delivering messages, according to an embodiment.
Figure 5:
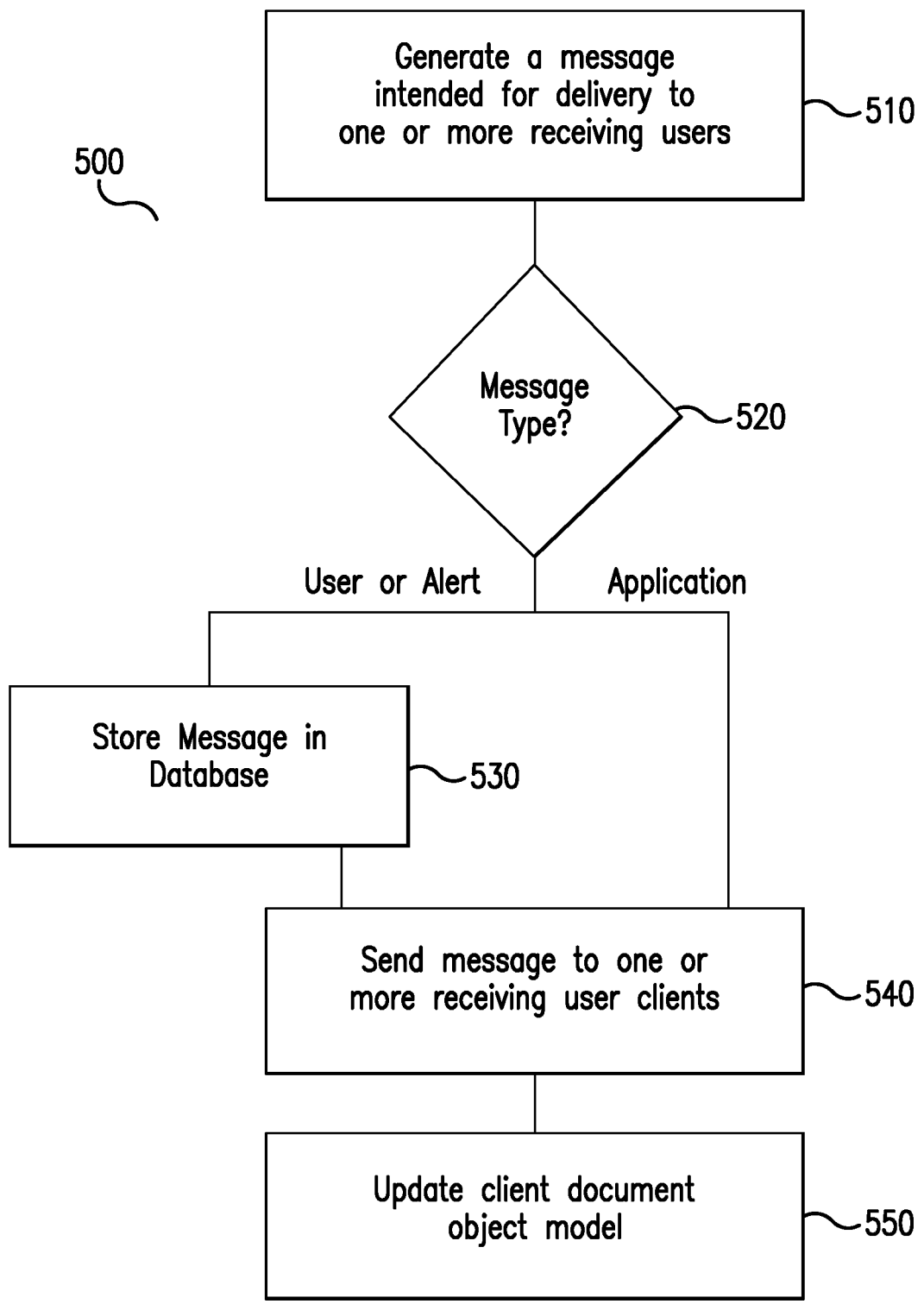
FIG. 5 is a flowchart that illustrates a method for managing message types, according to an embodiment.
Figure 6A:
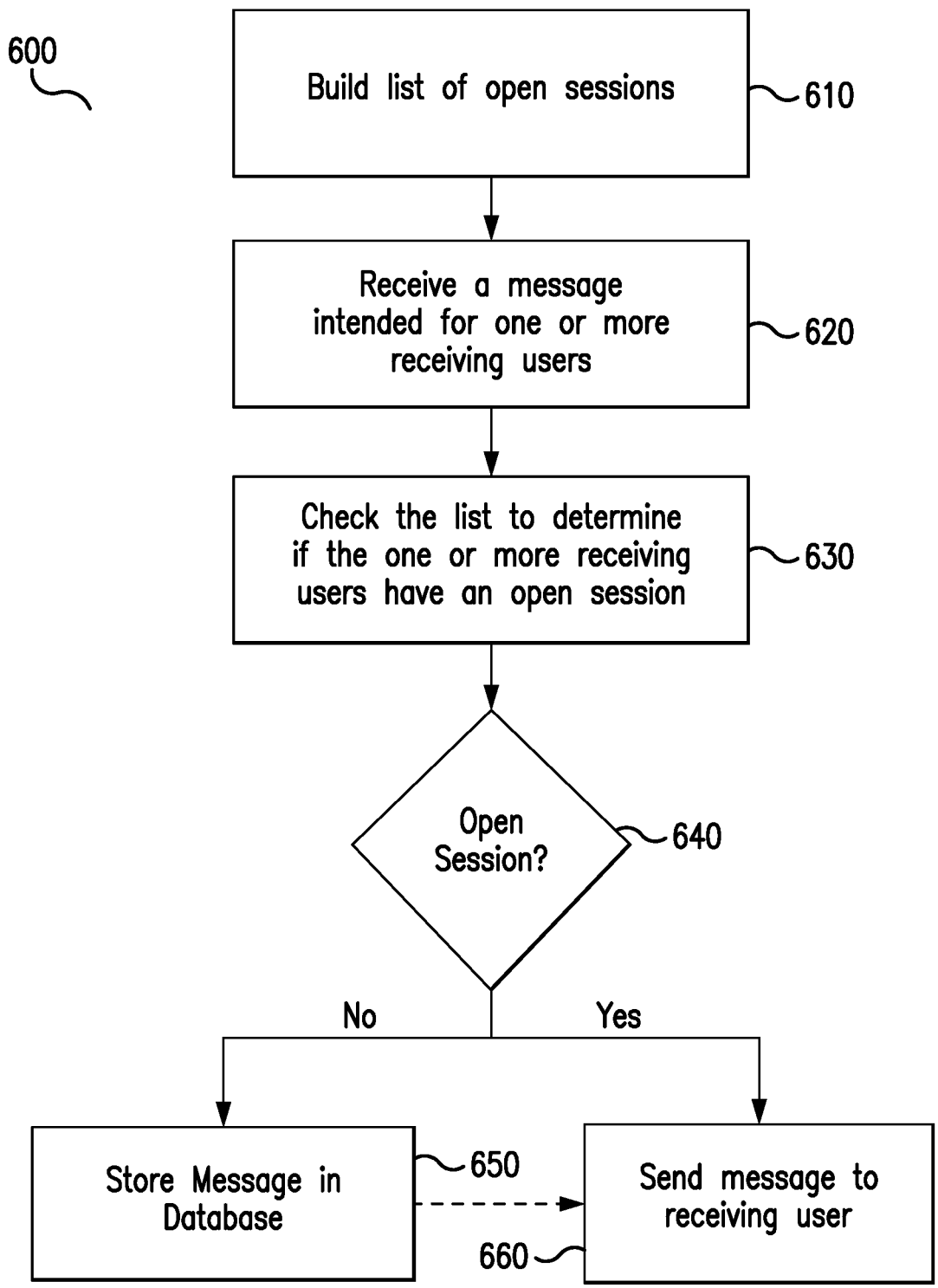
FIG. 6A is a flowchart that illustrates a method for managing user client states, according to an embodiment.
Figure 19:
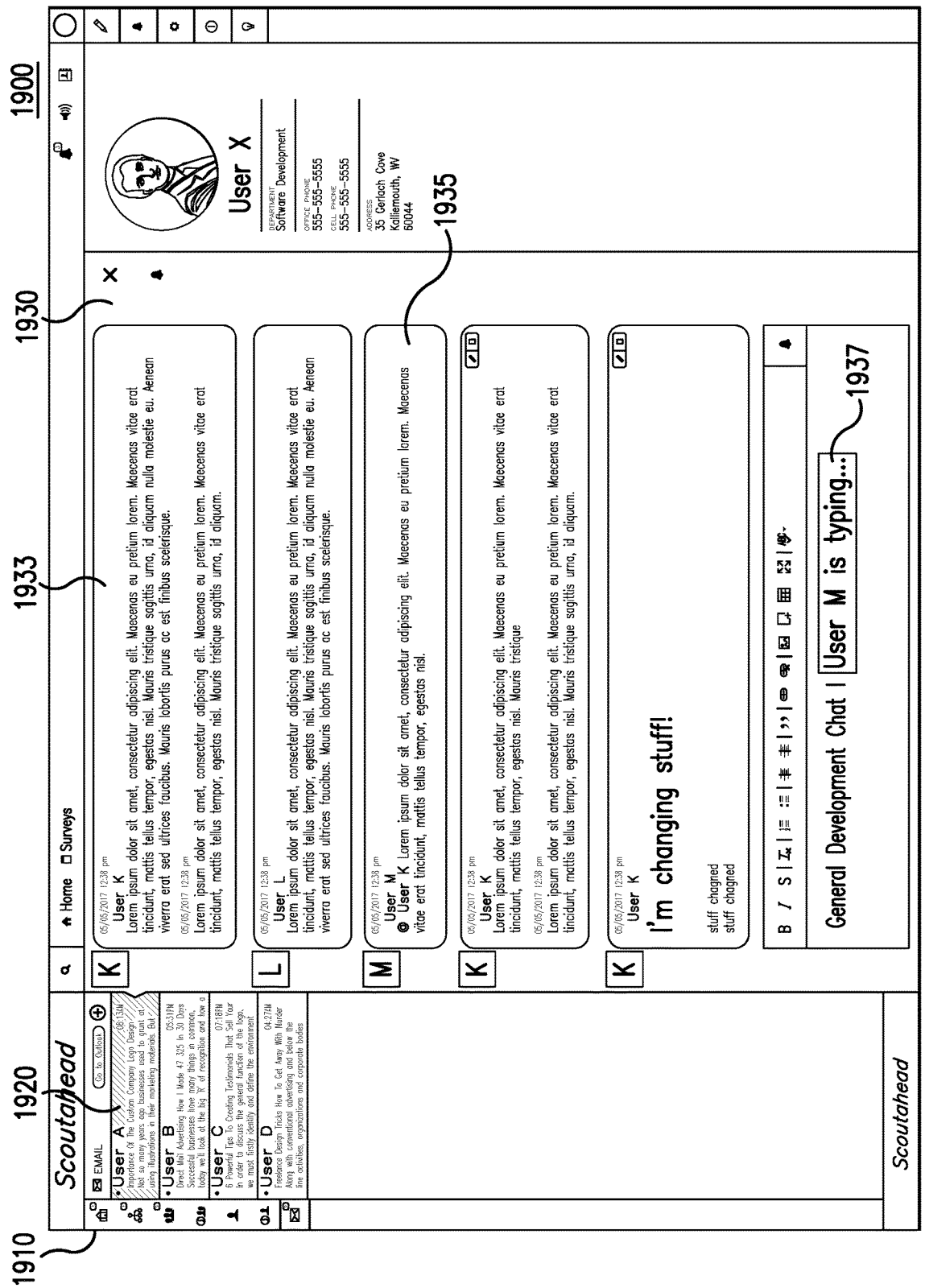
FIG. 19 is a diagram that illustrates a graphical user interface integrating chat messaging features and email messaging features, according to an embodiment.
Figure 20:
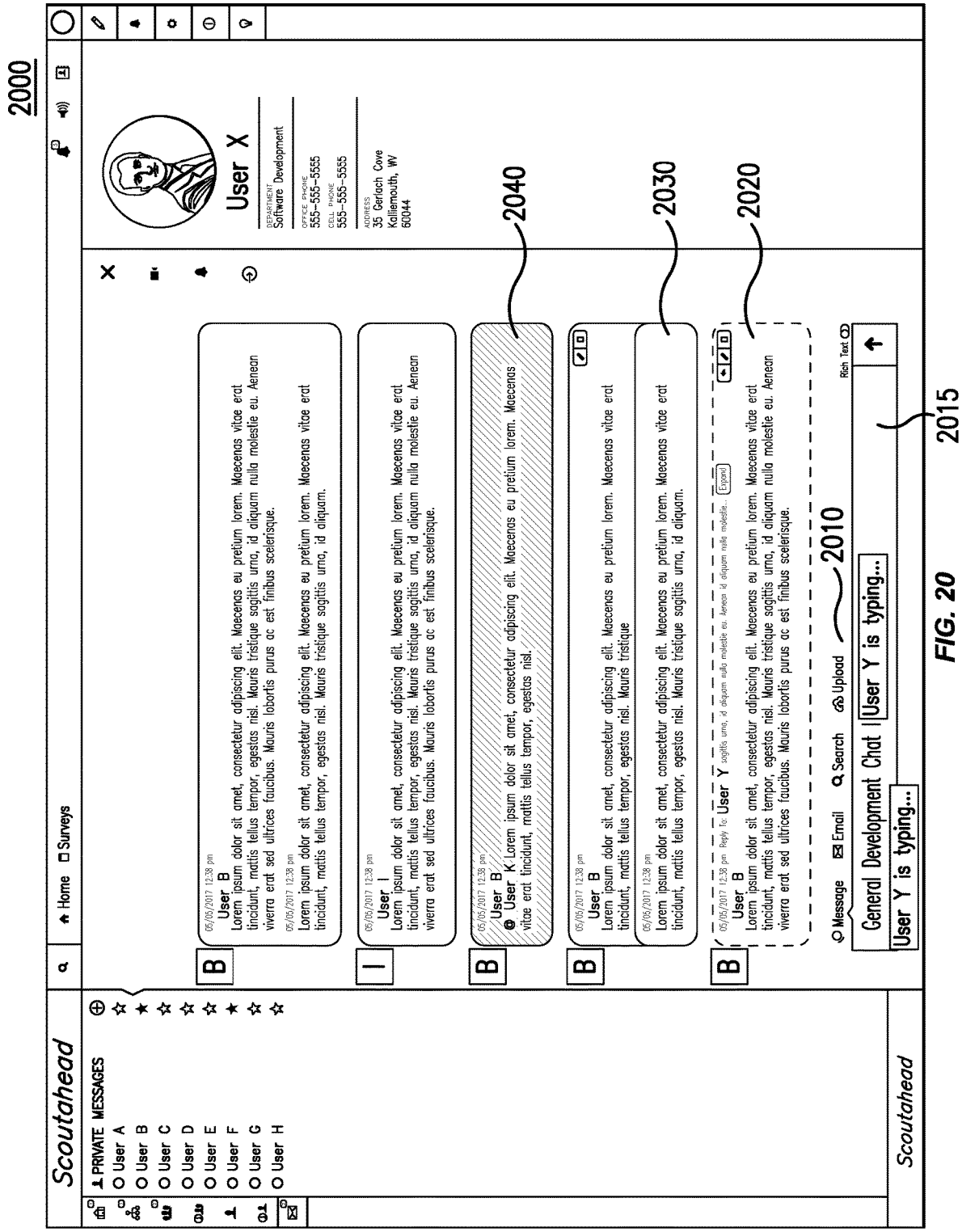
FIG. 20 is a diagram that illustrates a graphical user interface integrating chat messaging and email messaging response features, according to an embodiment.
Figure 21:
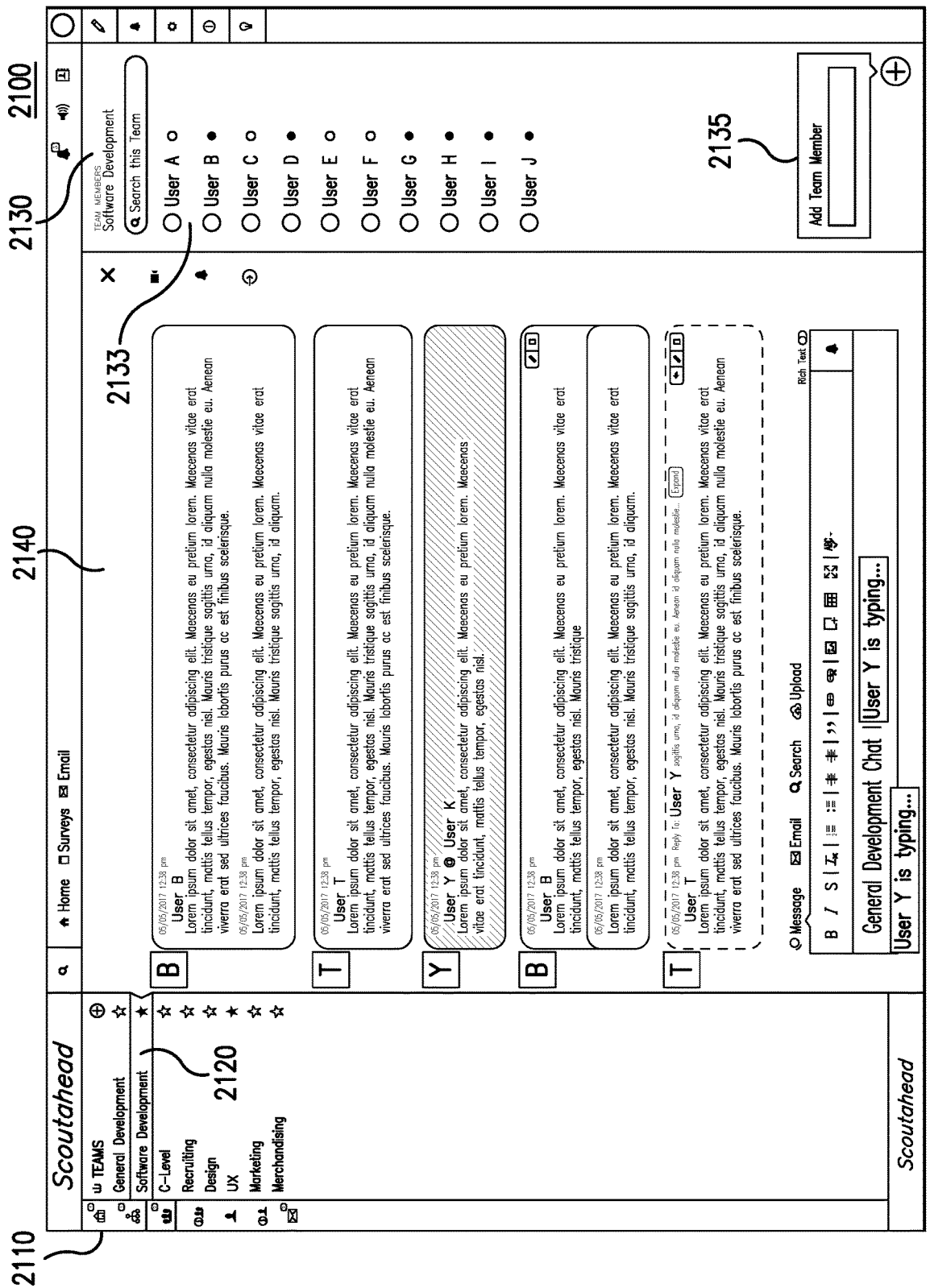
FIG. 21 is a diagram that illustrates a graphical user interface displaying group communication, according to an embodiment.
Figure 22:
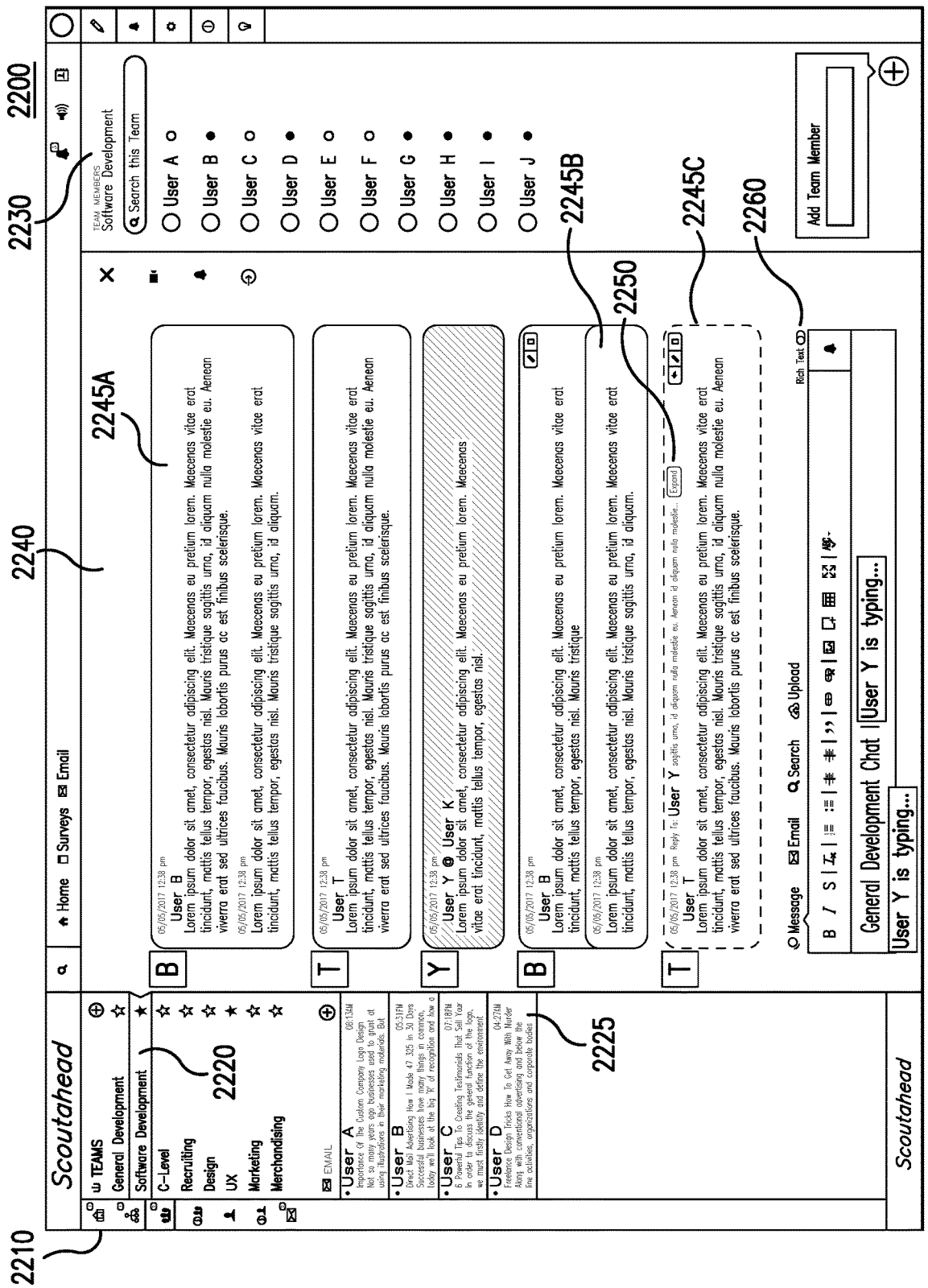
FIG. 22 is a diagram that illustrates a graphical user interface integrating chat messaging and email messaging for group communication, according to an embodiment.
Figure 23:
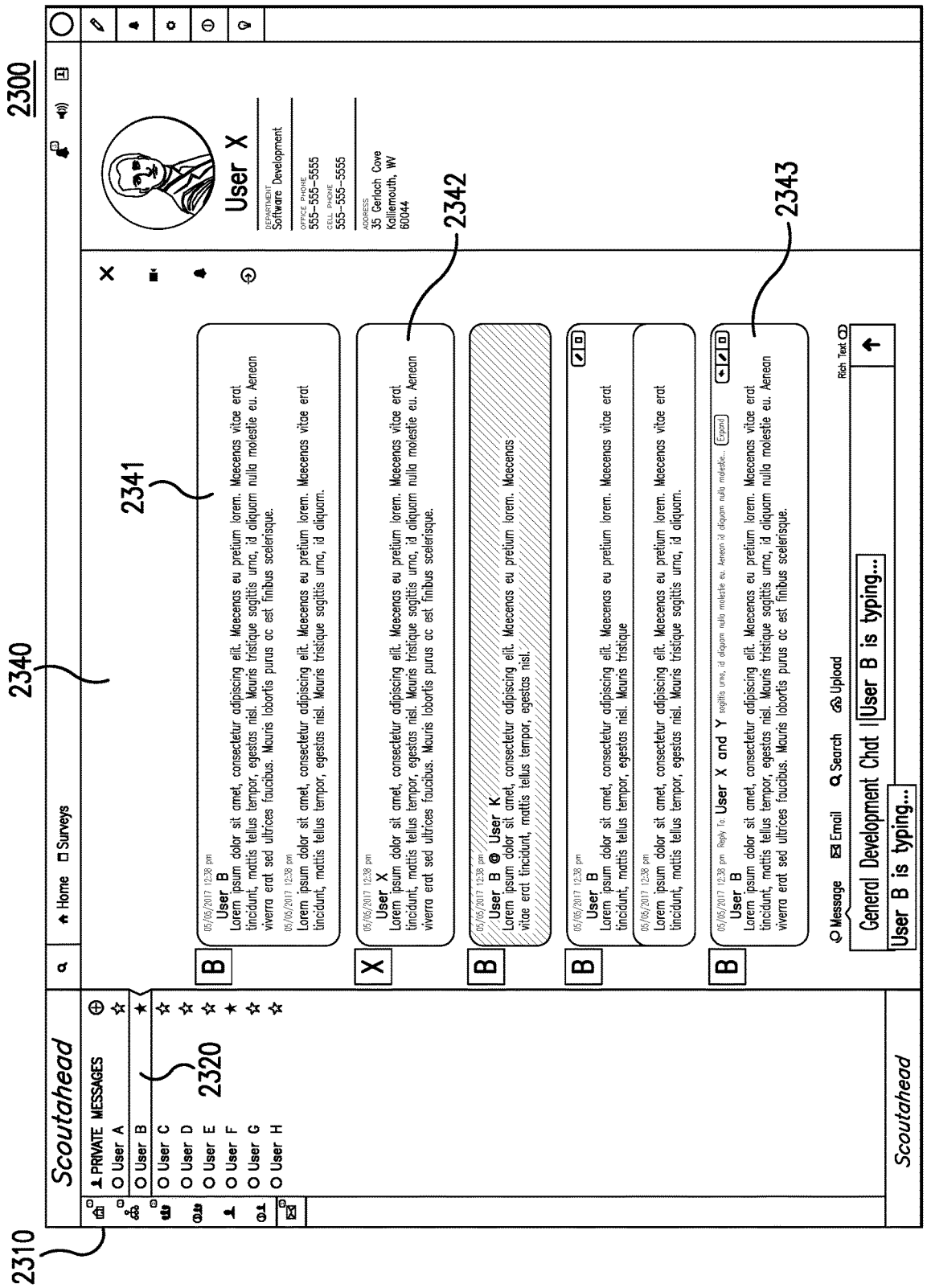
FIG. 23 is a diagram that illustrates a graphical user interface integrating chat messaging and email messaging for private communication, according to an embodiment.
Figure 24:
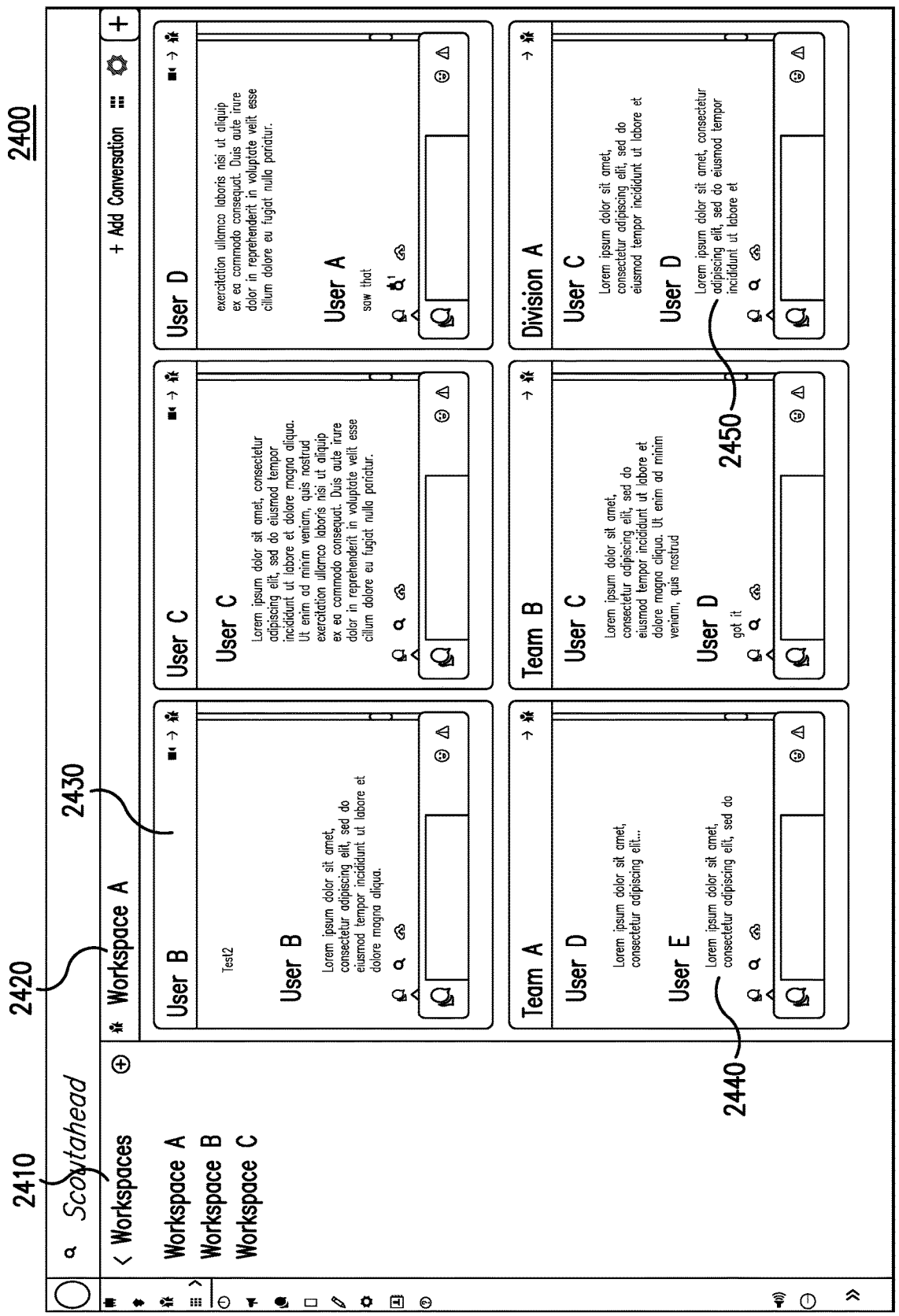
FIG. 24 is a diagram that illustrates a workspace graphical user interface, according to an embodiment.
Figure 25:
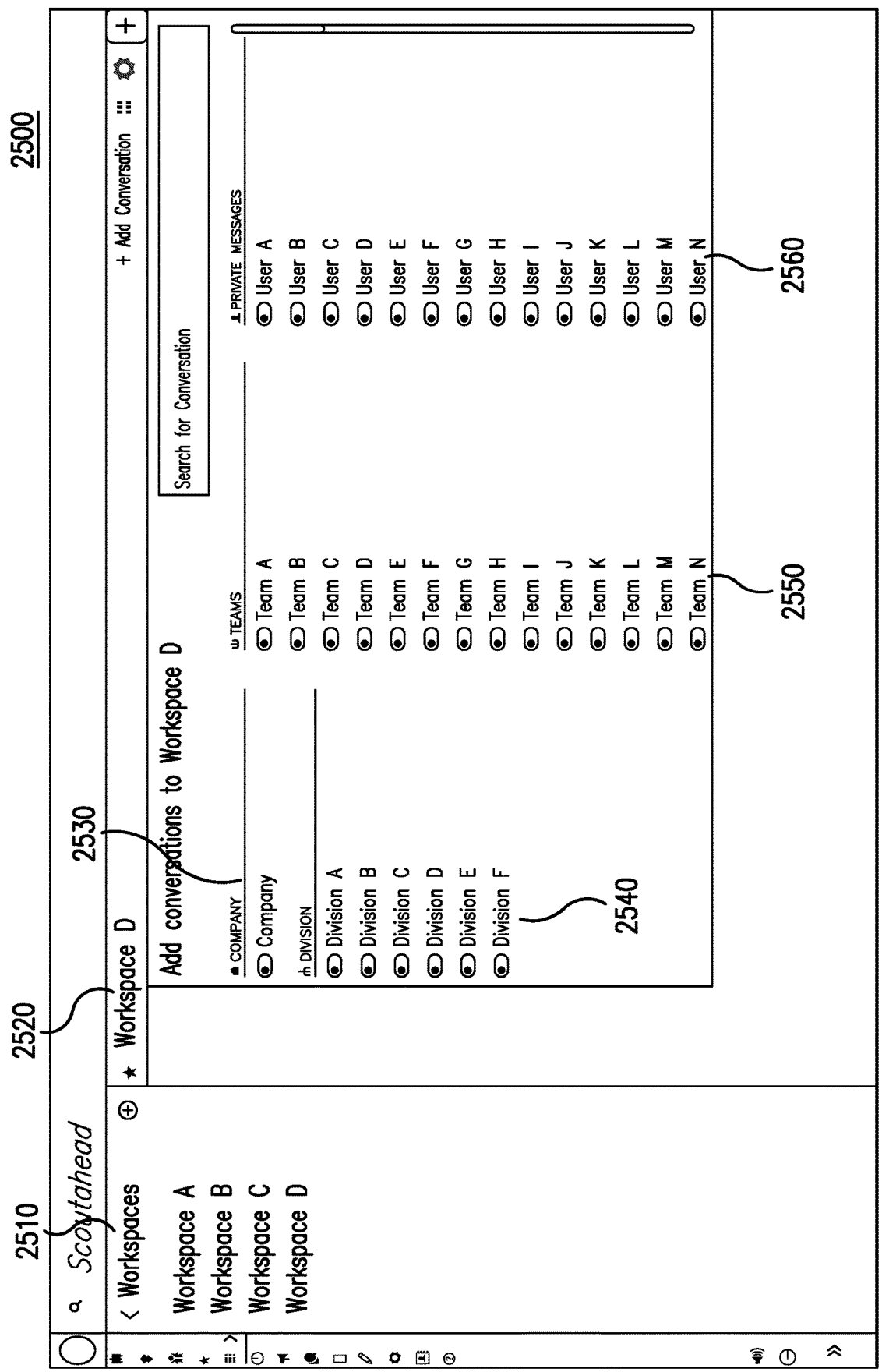
FIG. 25 is a diagram that illustrates a graphical user interface for configuring workspace communication channels, according to an embodiment.
Figure 26:
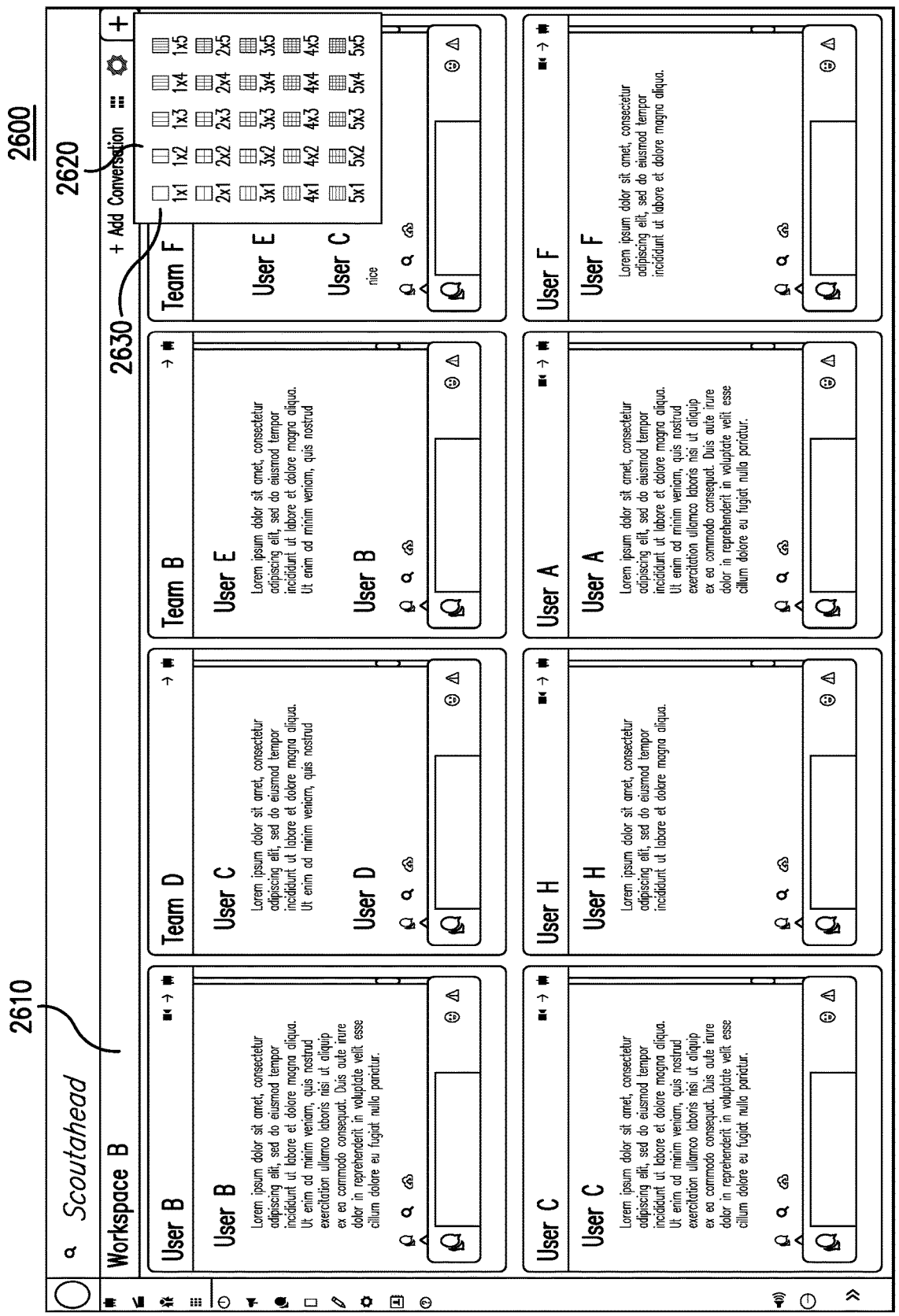
FIG. 26 is a diagram that illustrates a graphical user interface for configuring a workspace layout, according to an embodiment.
Figure 27:
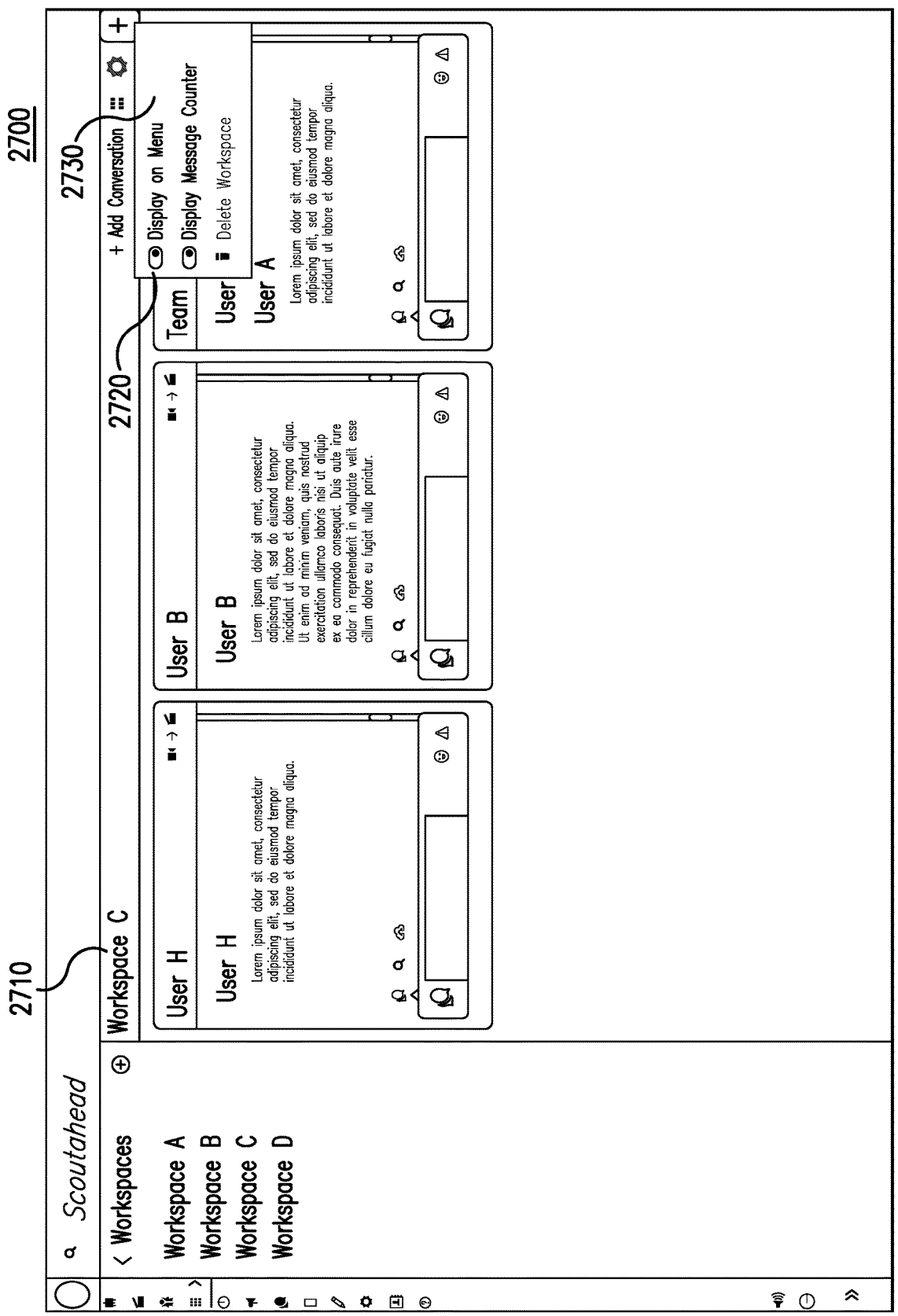
FIG. 27 is a diagram that illustrates a graphical user interface for configuring a workspace index, according to an embodiment.
Figure 28:
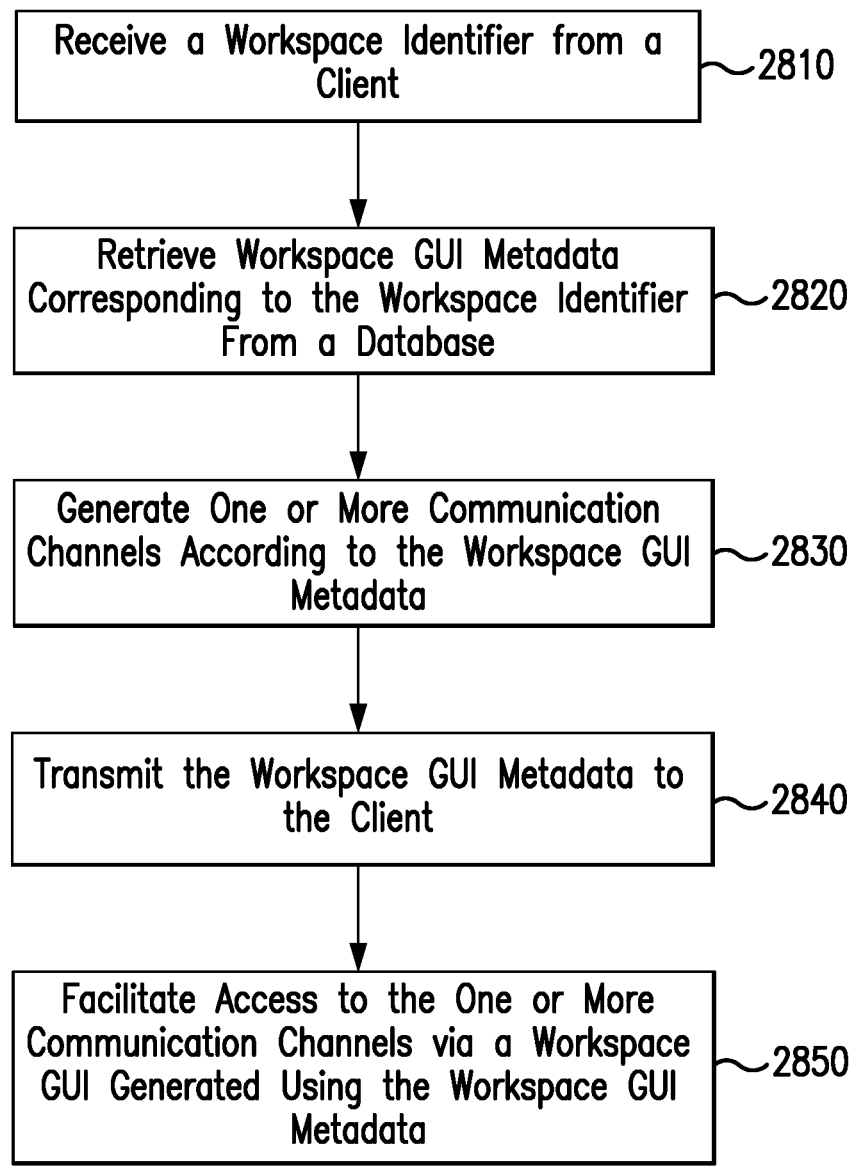
FIG. 28 is a flowchart that illustrates a method for generating a workspace, according to an embodiment.
Figure 29:
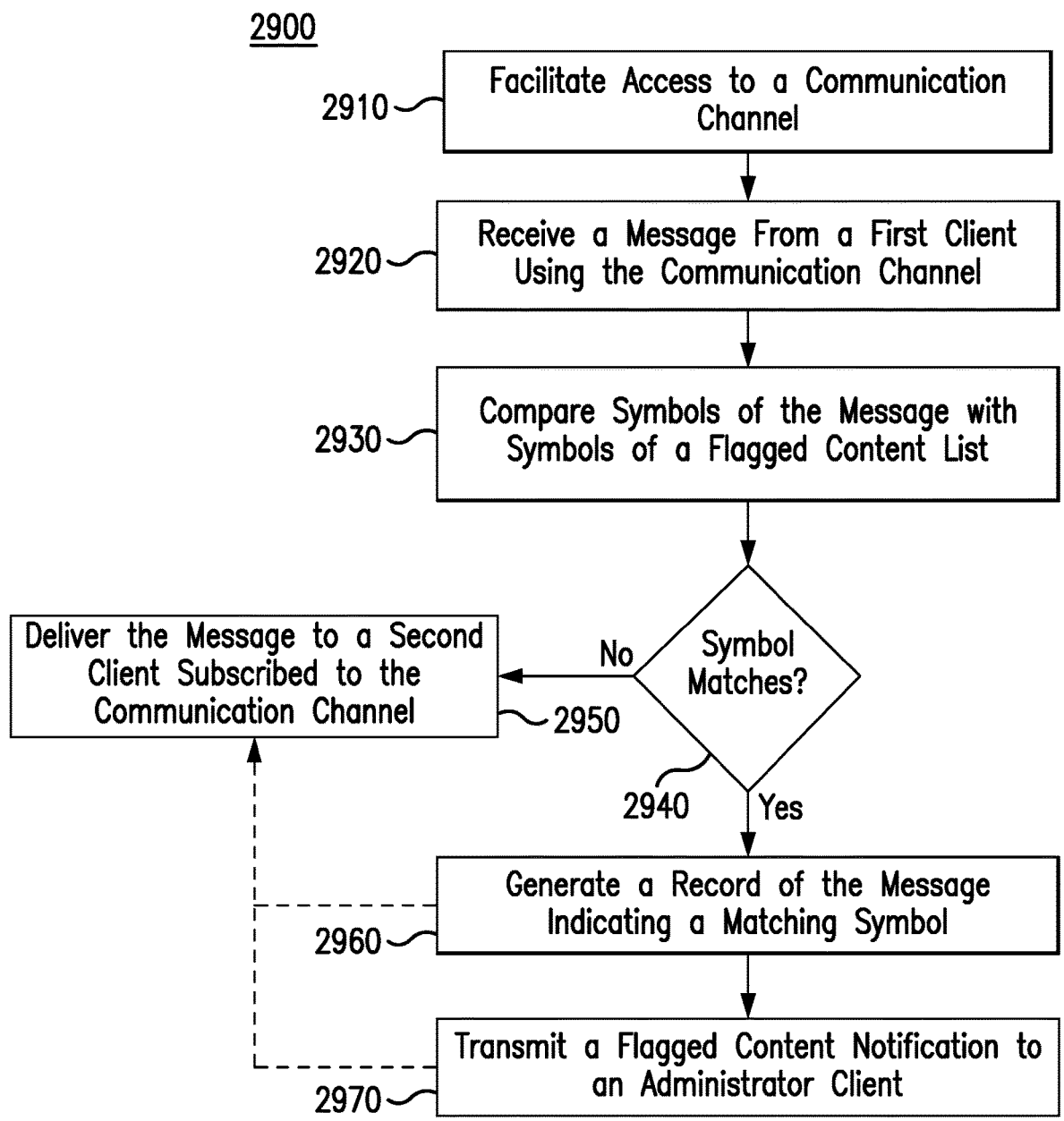
FIG. 29 is a flowchart that illustrates a method for monitoring message content, according to an embodiment.

Each of these features is described in greater detail below with respect to the drawings. FIG. 1A displays an organizational hierarchy for use with a messaging system and demonstrates groupings based on division groups and sub-division groups. FIG. 1B displays a team group messaging configuration between users belonging to different divisions. FIG. 1C displays a private group configuration between two users. Taken together, FIGS. 1A-1C demonstrate a hierarchical messaging organization. FIGS. 2A and 2B display chat panel configurations for a messaging system. These chat panels represent graphical user interfaces which users may utilize for sending or receiving messages. FIG. 3 displays a messaging system used to instantiate the chat panels represented in FIGS. 2A and 2B. FIG. 4 displays a method for delivering messages from a user to members of a messaging group. FIG. 5 displays a method for directing different messaging types. FIG. 6A displays a method for managing different user states while FIG. 6B displays a sub-method for user state management. A messaging system may execute the methods described with respect to FIGS. 4-5, 6A, and 6B. FIGS. 7-18 display graphical user interfaces and chat panels generated by a messaging system. FIG. 19 is a diagram that illustrates a graphical user interface integrating chat messaging features and email messaging features. FIG. 20 is a diagram showing chat messaging and email messaging response features. FIG. 21 displays a graphical user interface displaying team communication. FIG. 22 displays a graphical user interface integrating chat messaging and email messaging for team communication. FIG. 23 displays a graphical user interface integrating chat messaging and email messaging for private communication. FIG. 24 displays a workspace graphical user interface. FIG. 25 displays a graphical user interface for configuring workspace communication channels. FIG. 26 displays a graphical user interface for configuring a workspace layout. FIG. 27 displays a graphical user interface for configuring a workspace index. FIG. 28 displays a flowchart illustrating a method for generating a workspace. FIG. 29 displays a flowchart illustrating a method for monitoring message content.

FIG. 1A displays a block diagram illustrating an embodiment of a hierarchical messaging configuration 100. In an embodiment, hierarchical messaging configuration 100 represents organizational rules controlling the transmission and receipt of messages between users 130. These organizational rules aid in categorizing messages among groups of users as well as highlighting important messages. Hierarchical messaging configuration 100 is divided into various groups, including a company group 110, division groups 120A-120C, and sub-division groups 122 and 124. Users 130A-130J subscribe to division groups 120A-120C. A subset of the users 130 also subscribe to sub-division groups 122 and 124. Subscribing to a group allows users to receive messages from one or more group administrators. In some embodiments, subscribed users may also send messages to other users subscribed to a group. For example, an administrator may grant permissions to a user 130 to send messages to other members of a division group 120.

Figure 7:
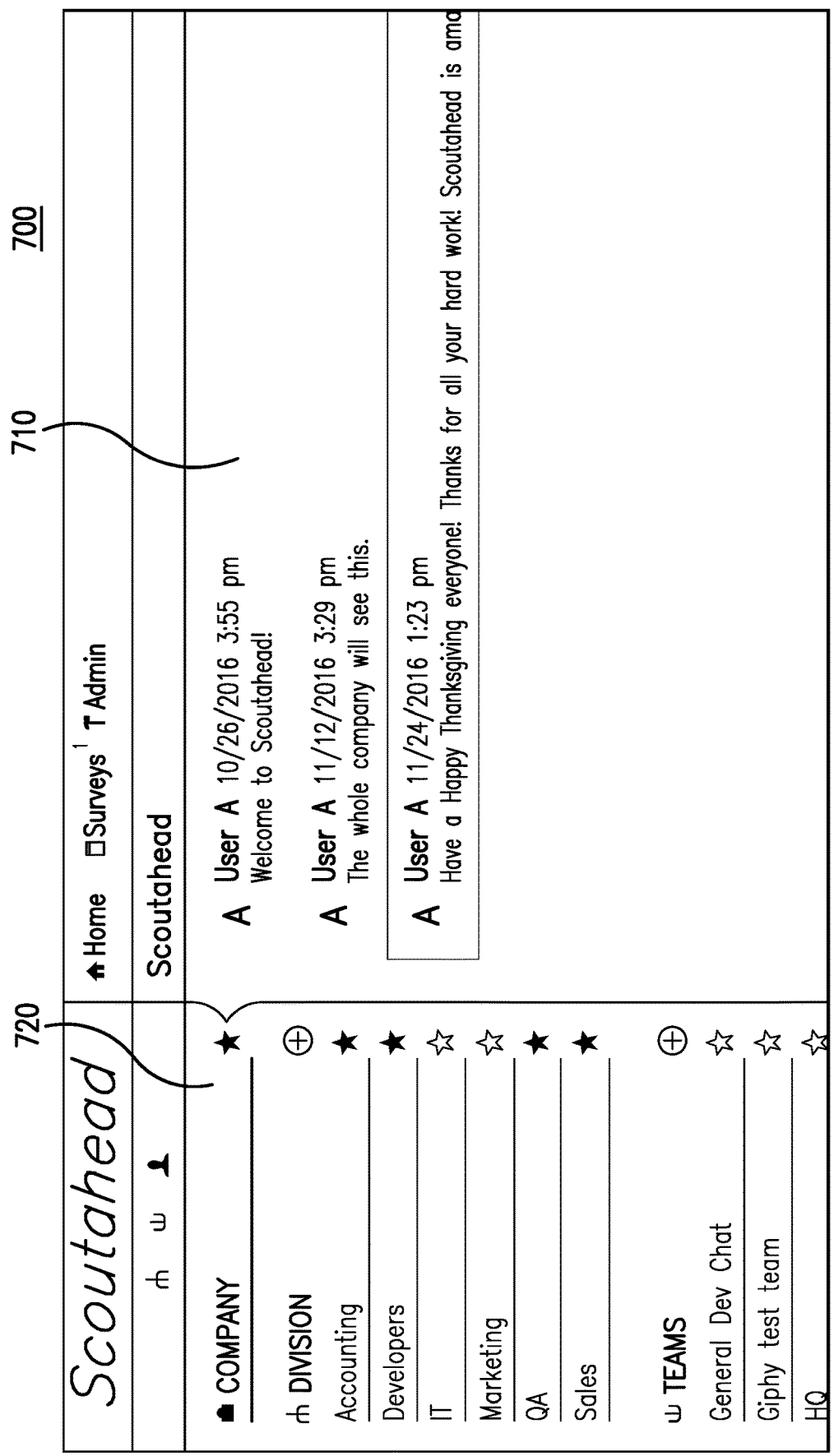
FIG. 7 is a diagram that illustrates a graphical user interface displaying a company chat panel, according to an embodiment.

In an embodiment, all users 130 subscribe to company group 110. An administrator may send a message to all users subscribed to company group 110. In a business environment, an administrator may be a company executive, manager, or person designated to control the hierarchical messaging configuration. In an embodiment, users may only receive messages from company group 110 without the ability to send messages to other users 130 subscribed to company group 110. An administrator may deliver an urgent or important message to a large volume of users 130. This configuration prevents a flood of response messages from users 130 that could bury the urgent and/or important administrator message. Further, this method prevents a flood of response messages that could overwhelm the administrator. In a business environment, an administrator may use company group 110 to deliver company news, updates, or emergency information. FIG. 2B depicts a chat panel embodiment of company group 110, and FIG. 7 depicts a graphical user interface embodiment that shows how a user 130 may view a message delivered from company group 110.

Figure 8:
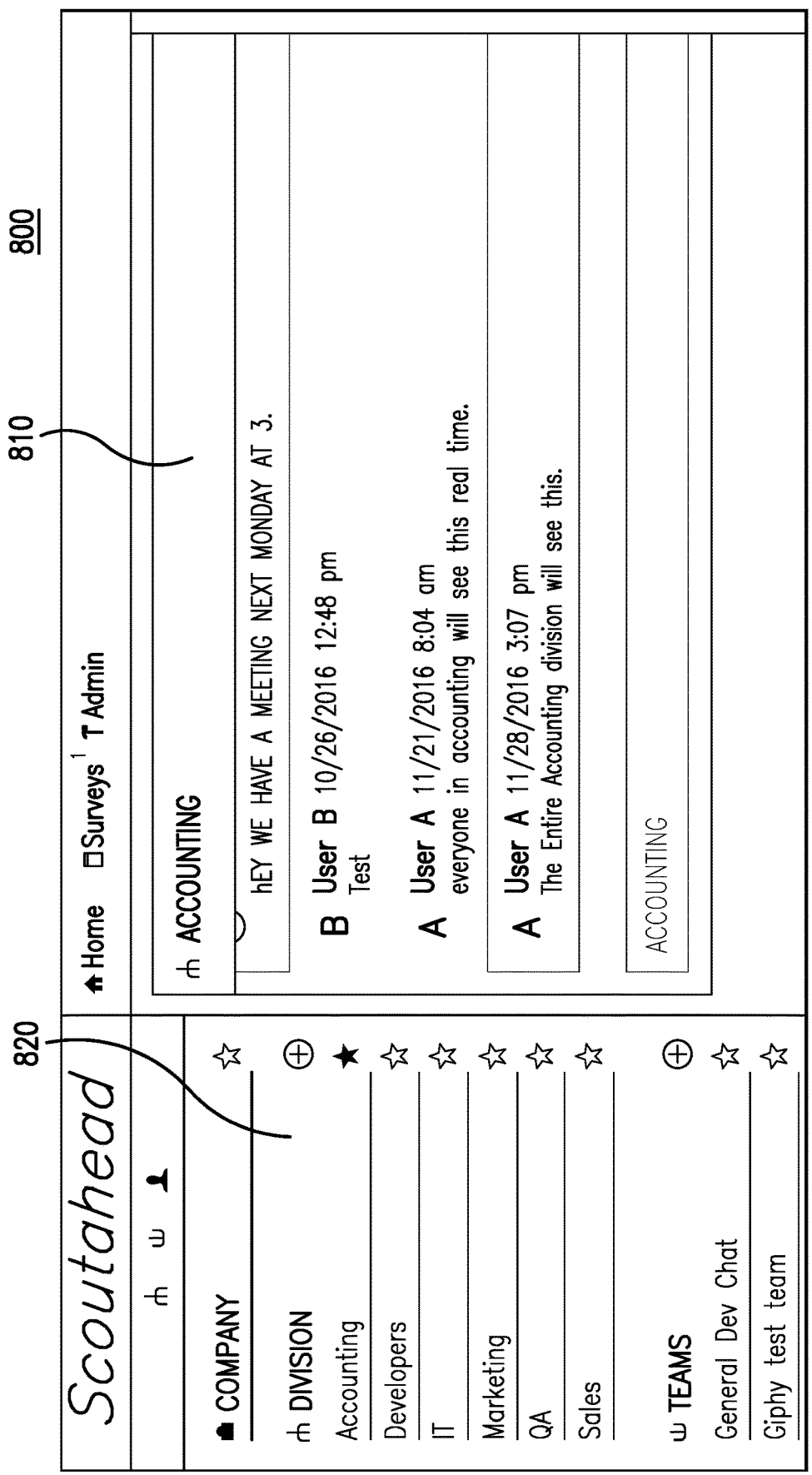
FIG. 8 is a diagram that illustrates a graphical user interface displaying a division chat panel, according to an embodiment.

In an embodiment, an administrator may group users into divisions 120. In a business environment embodiment, divisions 120 represent working groups while users represent employees. For example, divisions 120 may represent accounting, software development, IT, marketing, QA, or sales groups. Users 130 grouped into a particular division 120, or subscribed to a particular division 120, will be able to receive messages from administrators of that division 120. In an embodiment, divisions allow for subscribers to receive messages from managers and/or colleagues quickly and recognize the source of the message. FIG. 2B depicts a chat panel embodiment of division groups 120, and FIG. 8 depicts an embodiment of a graphic user interface allowing members of a division to receive messages from administrators of the division.

In an embodiment, an administrator may determine which users 130 belong to which divisions 120. That is, an administrator may assign users 130 to one or more division groups 120. In a business organization environment, an administrator may be any employee with the ability to edit user groups. An administrator may also be a senior-level employee with management powers or decision-making authority. In an embodiment, division groups 120 are mandatory and specific, meaning users will not be able to leave an assigned division group 120 and may only join a division group 120 when upper management has determined that the user should be subscribed to that division group 120. For example, if an administrator has assigned user 130A to division group 120A, the user may not unsubscribe from division group 120A without administrator permission. Additionally, the user may not subscribe to division group 120B without administrator permission. FIG. 13 provides an embodiment of a graphical user interface allowing an administrator to assign users to division groups 120. Dividing employees into division groups 120 allows administrators to deliver messages or announcements to users 130 subscribed to the particular division group 120. Division groups 120 also grant control to administrators to control the hierarchical messaging configuration 100.

In an embodiment, division groups 120 may be divided into sub-division groups. For example, division group 120A may include a sub-division group 122. Users 130A and 130B may subscribe directly to division group 120A while users 130C-130E may subscribe to both division group 120A and sub-division group 122. Users 130C-130E may then receive messages from both division group 120A and sub-division group 122. Sub-division groups may be useful in situations where a division group 120 may include too many users 130 to efficiently deliver relevant information to subscribed users. For example, if division group 120C represents all doctors in a hospital, sub-division group 124 may represent specific medical specializations, such as cardiology or radiology. In an embodiment, an administrator may designate users 130 subscribed to a subdivision group 122.

Figure 9:
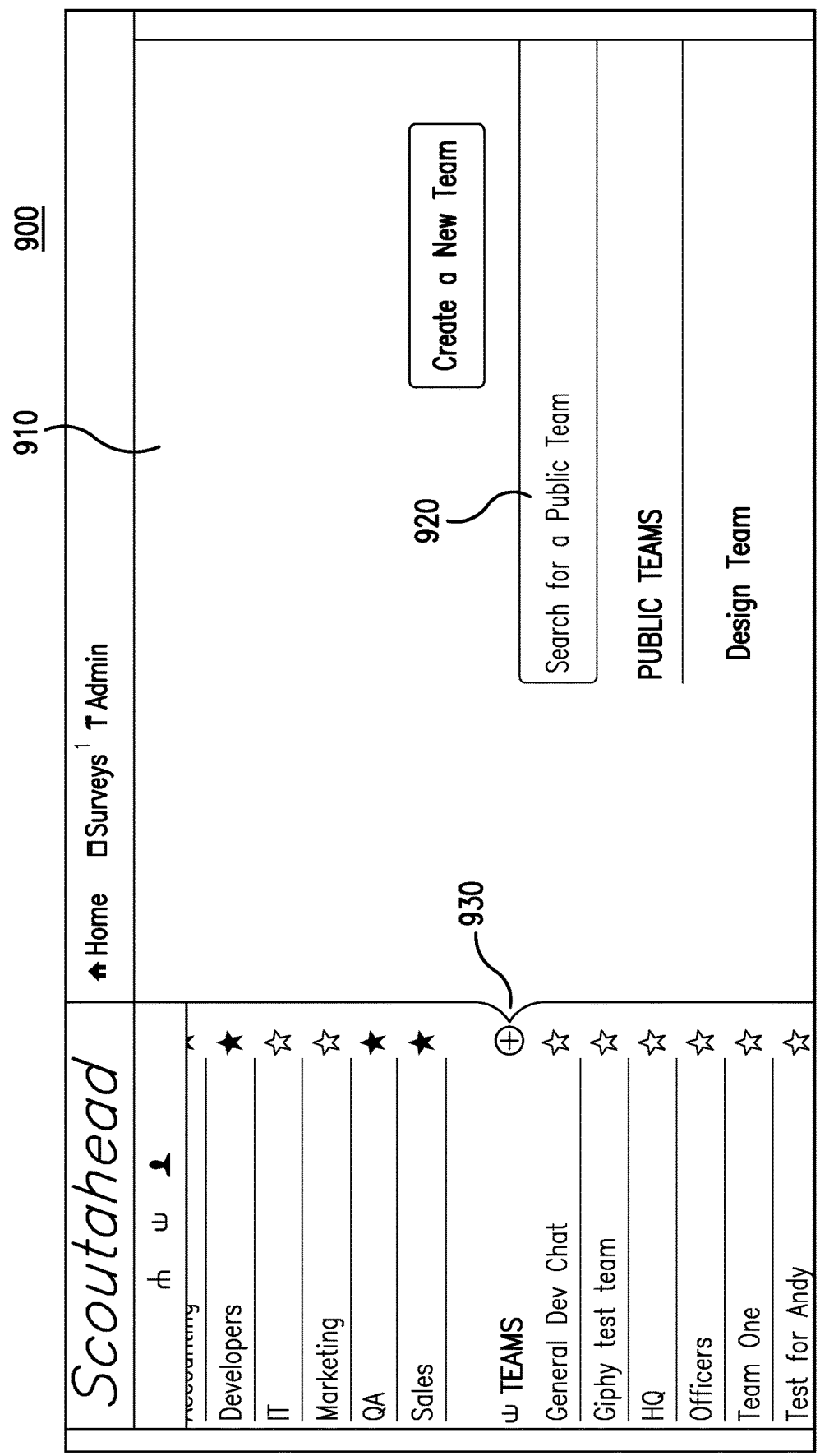
FIG. 9 is a diagram that illustrates a graphical user interface for team chat panel selection, according to an embodiment.

FIG. 1B displays a block diagram of a team group messaging configuration 140, according to an embodiment. The team group messaging configuration 140 is also a feature of hierarchical messaging configuration 100. Team group messaging configuration 140 may include a team group 150 with several subscribed users 130. In an embodiment, users 130A, 130B, 130H, and 130G may be subscribed to team group 150, demonstrating that users 130 from different division groups 120 may subscribe to team group 150. Team group 150 may represent a personal messaging group. For example, a user 130 may create a team of co-workers to discuss a project, a cross-division issue, or non-work related topics. In contrast to division groups 120, team group 150 may be user-generated with an invitation type system to add or remove more users from the team. In an embodiment, an administrator may be able to access team chat panels and view and/or send messages to the team. FIG. 2A provides a chat panel embodiment for team groups, and FIG. 9 provides an embodiment of a graphical user interface allowing a user 130 to create a team. The graphical user interface allowing users 130 to chat with other team members may have a layout similar to that depicted for division groups 120 in FIG. 8.

Figure 11:
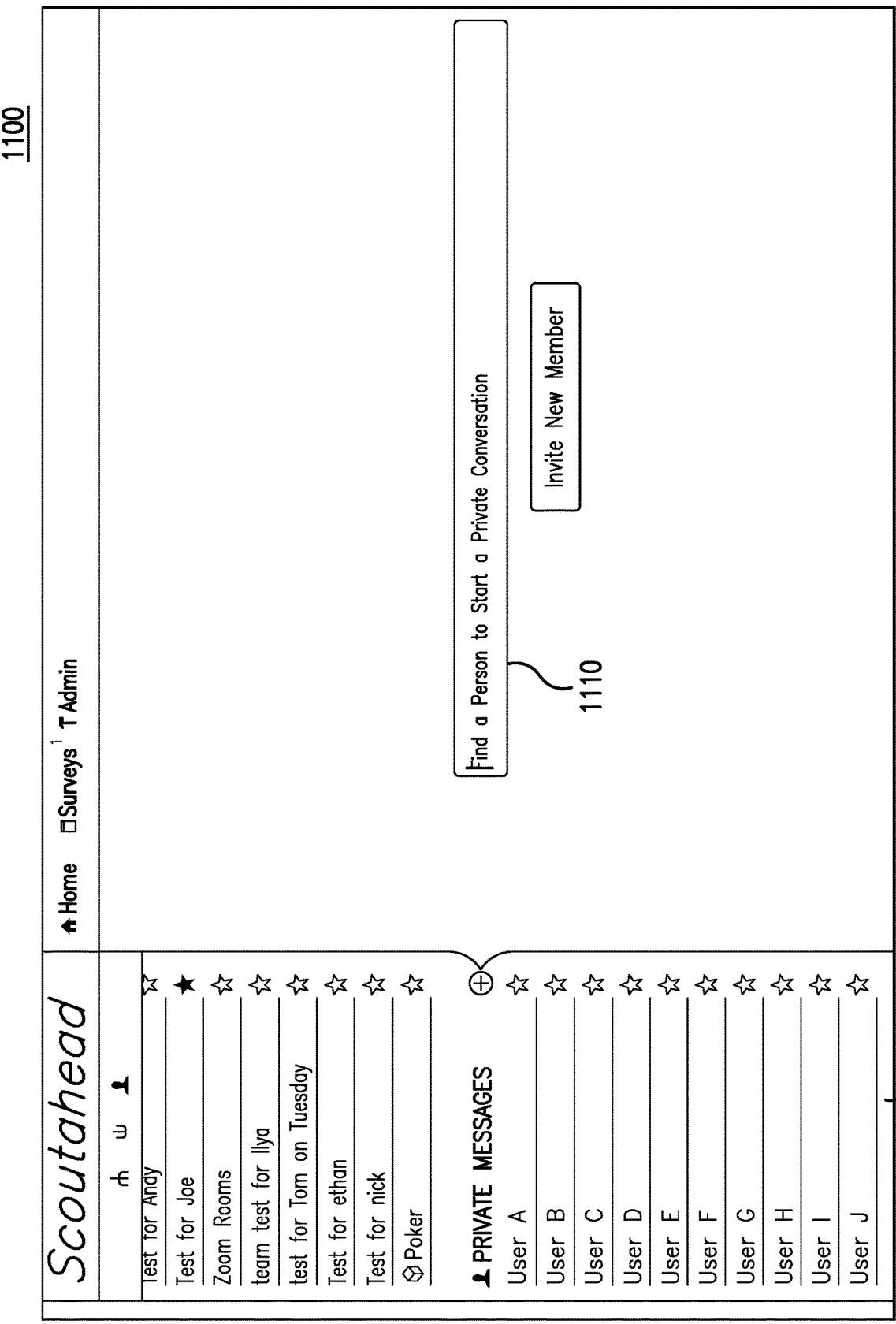
FIG. 11 is a diagram that illustrates a graphical user interface for selecting a private message chat panel, according to an embodiment.

FIG. 1C displays a block diagram of a private group messaging configuration 160, according to an embodiment. Private group messaging configuration 160 is also a feature of hierarchical messaging configuration 100. Similar to team group messaging configuration 140, private group 170 may represent a personal messaging group. A user 130 may create a private group with 170 and invite one other user to subscribe. This feature simulates instant messaging between two users, such as, for example, user 130C and user 130I. In an embodiment, private group 170 supports only two users, but the users may belong to different division groups 120. FIG. 11 shows a graphical user interface enabling a user to initialize a private group 170.

FIG. 2A shows a block diagram illustrating an embodiment of a messaging system 200, highlighting team messaging. Messaging system 200 comprises chat panels 210a-210b, users 220a . . . 220N, and administrator 230. Although FIG. 2A depicts two chat panels 210a-210b (collectively referred to as 210), six users 220a . . . 220N (collectively referred to as 220), and one administrator 230, messaging system 200 may comprise any number of chat panels, users, and administrators. Messaging system 200 provides chat panels 210 that allow users 220 to communicate via a real-time message delivery system. Messages may include text, image, video, audio, documents, data files, compressed data files, or transaction information.

In an embodiment, chat panels 210 may represent graphical user interfaces for user 220 messaging. FIGS. 7, 8, 10, 15, and 18 depict embodiments of this graphical user interface represented as chat panels 210. Users 220 may view and utilize one or more chat panels to send and receive messages. In an embodiment, each chat panel 210 represents a team. For example, chat panel 210a may represent an "accounting" team while chat panel 210b represents a "QA" team.

In an embodiment, users 220 subscribe to chat panels 210, wherein users 220 may send messages to and receive messages from the chat panels 210. For example, users 220a, 220b, . . . , 220n may subscribe to chat panel 210a. User 220a may send a message to chat panel 210a, which then routes the message to the other subscribed users 220b, 220n. Users 220b, . . . , 220n may also send messages to chat panel 210a for other subscribed users to receive, including user 220a. For example, chat panel 210a may represent a team of members from the accounting division. User 220a may send a message to other members of this accounting team by utilizing chat panel 210a. The other users will then receive the message also utilizing chat panel 210a.

In an embodiment, a plurality of chat panels 210 may exist in messaging system 200. For example, users 220A, 220B, . . . , 220N may subscribe to chat panel 210b but not to chat panel 210a. Because users 220A, 220B, . . . , 220N are only subscribed to chat panel 210b, they will only receive messages from chat panel 210b. Without subscribing to chat panel 210a, users 220A, 220B, . . . , 220N will not receive messages from chat panel 210a. In an embodiment, user 220n is subscribed to both chat panel 210a and 210b. User 220n will be able to send and receive messages from both chat panels 210a and 210b. In an embodiment, user 220n may be subscribed to two teams and may send and/or receive messages from both teams.

In an embodiment, chat panels 210 instantiate a graphical user interface for user 220 messaging. Users 220 may view and utilize the graphical user interface to send and receive messages. The graphical user interface of a chat panel 210 also provides a repository or archive of messages, so that subscribed users 220 may view some or all of the messages that have ever been sent to the chat panel 210. If a user is subscribed to multiple chat panels 210, the user may also view multiple graphical user interfaces associated with each of the chat panels 210.

Figure 10:
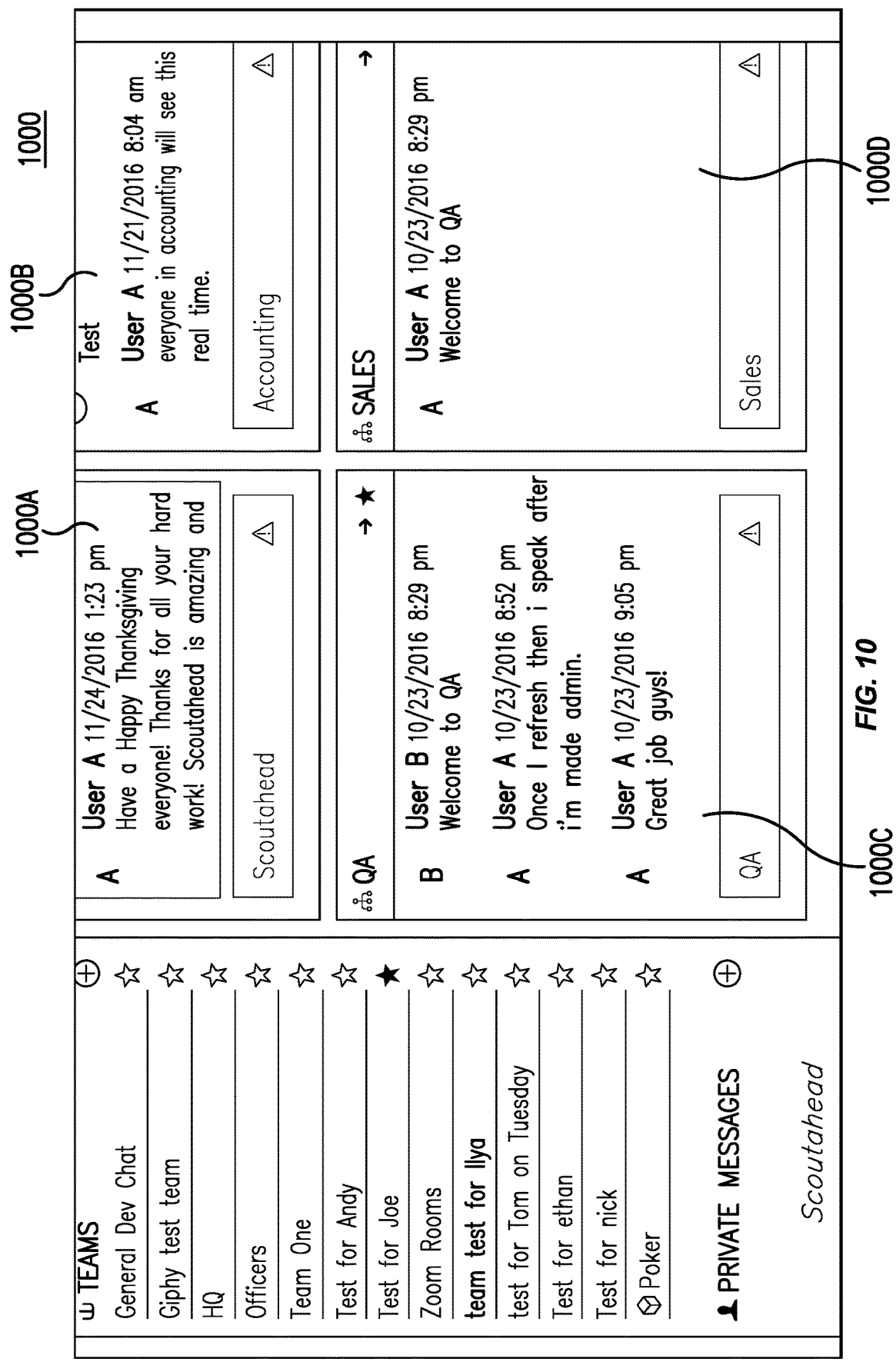
FIG. 10 is a diagram that illustrates a graphical user interface displaying multiple chat panels, according to an embodiment.

In an embodiment, a user may view messages from multiple chat panels 210 in a single graphical user interface. FIGS. 10 and 15 provide embodiments displaying multiple chat panels 210 in a single graphical user interface. Users who subscribe to multiple chat panels 210 will be able to quickly and efficiently send and receive messages from other chat panel subscribers and will also be able to see a continuous, archived display of messages. This medium of communication will allow users 220 to quickly send and receive messages to and from other users while also creating an organized medium for retrieving past messages. Users 220 will be able to easily access a chat panel 210 and obtain relevant messages from other users 220 subscribed to that chat panel. In an embodiment, the graphical user interface of chat panels 210 may resemble an Internet chat room.

In an embodiment, users 220 may utilize a chat panel 210 to generate a team, or a personal group for messaging. For example, a user 220 may create a team of co-workers to discuss a project, a cross-division issue, or non-work related topics. In contrast to divisions, teams may be user-generated with an invitation type system to add or remove more users from the team. In an embodiment, administrator 230 may be able to access team chat panels and view and/or send messages to the team. FIG. 9 provides an embodiment of a graphical user interface allowing a user 220 to create a team that will utilize a chat panel 210. The graphical user interface allowing users 220 to chat with other team members may have a layout similar to that depicted for divisions in FIG. 8.

FIG. 2B shows a block diagram illustrating an embodiment of a messaging system 200, highlighting organization-wide messaging and division messaging. Messaging system 200 includes a chat panel 210c with user 220a, . . . , 220N (collectively referred to as 220). Compared to the chat panel 210 embodiments depicted in FIG. 2A, chat panel 210c does not receive messages from users 220. Rather, chat panel 210c will only send messages to users 220. Administrator 230 may send messages to chat panel 210c for distribution to users 220. An administrator 230 may use chat panel 210c to deliver an urgent or important message to a large volume of users 220. This embodiment allows for an administrator 230 to quickly deliver a message to users 220 without allowing the users 220 to respond. This chat panel configuration prevents a flood of response messages from users 220 that could bury the urgent and/or important administrator message. Further, this method prevents a flood of response messages that could overwhelm administrator 230. In a business environment, an administrator 230 such as a company executive or manager may use chat panel 210c to deliver company news, updates, or emergency information. FIG. 7 depicts a graphical user interface embodiment that shows how a user 220 may view a message sent from chat panel 210c.

In an embodiment, a business organization may utilize messaging system 200 to organize division messaging. An administrator 230 may group users by divisions and assign a chat panel 210c to the division. Members of the division will then utilize the assigned chat panel 210c to receive communications from administrator 230. For example, divisions may include accounting, software development, IT, marketing, QA, or sales. Users grouped into a particular division, or subscribed to a particular division, will be able to use a particular chat panel 210c to receive messages from other users subscribed to that division. FIG. 8 depicts an embodiment of a graphical user interface allowing members of a division to receive message from an administrator 230 of the division and/or members of the division given permissions to send messages to other members of the division.

In an embodiment, an administrator 230 may determine which users 220 belong to which divisions and which chat panels 210. That is, an administrator 230 may assign users 220 to one or more divisions. In a business organization environment, an administrator 230 may be any employee with the ability to edit user groups. An administrator may also be a senior-level employee with management powers or decision-making authority. In an embodiment, divisions are mandatory and specific, meaning users will not be able to leave the division and may only join a division when upper management has determined that the user should be subscribed to that division's chat panel 210. FIG. 13 provides an embodiment of a graphical user interface allowing an administrator 230 to assign users 220 to divisions. Dividing employees into divisions allows for group-based messaging and also allows users to receive communications related to their job function. Divisions also grant control to administrators 230 to control the users of chat panel 210c.

FIG. 3 shows a block diagram illustrating an embodiment of messaging system 300 with a focus on the hardware components. Messaging system 300 implements the embodiments described with reference to FIGS. 1A-1C, 2A-2B, and 7-18. Messaging system 300 comprises messaging database 310, messaging servers 320a-320c, message delivery channels 330a-330c, and load balancer 340. A client device 350 may interact with messaging system 300 via a connection to load balancer 340. Web-based components allow for a messaging system that is not application-based, or does not require a user to install an application.

In an embodiment, a chat panel 210 as depicted in FIGS. 2A and 2B may be instantiated using messaging system 300. For example, a user subscribed to a particular chat panel may utilize a client device 350 to deliver a message to other subscribed users. An administrator may also use client device 350 to interact with chat panels. Client device 350 may be an electronic device with messaging capabilities, such as, for example, a telephone, tablet, computer, laptop, or other smart devices. Client device 350 may display a graphical user interface for the user to utilize when receiving or delivering messages. The user may use the client device 350 to connect to messaging system 300, which may be configured to instantiate the chat panel. In an embodiment, messaging system 300 instantiates multiple chat panels, allowing many users to subscribe to one or more chat panels. In an embodiment, messaging system 300 is implemented in a web-based platform and client device 350 may use a computer communications protocol to connect to messaging system 300, such as, for example, Web Socket®, HTTP, or BOSH. In an embodiment, client device 350 may be required to install an application to access the chat panels of messaging system 300.

To deliver messages, messaging system 300 relies on several components. In an embodiment, client device 350 connects to messaging system 300 via load balancer 340. Load balancer 340 may be a standalone server or may be a portion of a server. Load balancer 340 receives a connection request from a client device 350 and determines a messaging server 320 with which to connect the client device 350. In an embodiment where many client devices 350 are attempting to connect to messaging system 300, load balancer 340 attempts to evenly distribute the connections to different messaging servers 320. By distributing the connections, stress on individual messaging servers 320 is reduced.

Once load balancer 340 has determined a messaging server 320 to which client device 350 may connect, a session is open between the messaging server 320 and client device 350. The client device 350 and messaging server 320 may communicate via a messaging protocol, such as, for example, Web Socket®. In the embodiment depicted in FIG. 3, client device 350 has connected to messaging server 320b. While FIG. 3 depicts three messaging servers 320a-320c, messaging system 300 may utilize many more messaging servers 320 to route messages and instantiate chat panels. In an embodiment, messaging system 300 may use one or two messaging servers 320. In an embodiment, messaging servers 320 may be a commercial server, such as, for example Apache Tomcat®.

Once a session is open between a client device 350 and messaging server 320, client device 350 may send messages to and/or receive messages from the connected messaging server 320. In an embodiment, a user uses client device 350 to send a message to messaging server 320b. This message is intended to be received by other users who are subscribed to the same chat panel as the sending user. After the user generates a message at client device 350, client device 350 sends the message to messaging server 320b. Messaging server 320b then generates a list of users who are meant to receive the message. In an embodiment, the client device 350 may already generate the list of intended receiving users and send the list and the message to messaging server 320b. Messaging server 320b then checks to determine if a receiving user is connected to messaging server 320b. Messaging server 320b then sends the message and the list of intended receiving users to the other messaging servers 320a and 320c in messaging system 300.

To send the message and list of intended users, messaging server 320b uses message delivery channels 330. In an embodiment, messaging server 320b sends the message and list to messaging server 320a via message delivery channel 330a and to messaging server 320c via message delivery channel 330b. In an embodiment, where messaging server 320a or 320c delivers a message and/or list of users to the other, message delivery channel 330c may be used. In an embodiment, a message delivery channel 330 may be instantiated using a messaging library, a message transfer protocol, or a messaging pattern optimized for delivering messages. For example, message delivery channel 330 may be formed using ZeroMQ®, Berkeley sockets, or an application programming interface for message handling.

In an embodiment where more messaging servers 320 exist, messaging server 320b sends the message and list to all the other messaging servers 320. When a messaging server 320 receives a message and list containing an identification of desired receiving users, the messaging server 320 checks an internal cache of connected open sessions. These open sessions represent connections from other client devices that are also connected to messaging system 300 via another messaging server 320 such as messaging server 320a or 320c.

In an embodiment, messaging server 320a receives a message and list from messaging server 320b, corresponding to the message delivered from client device 350. Messaging server 320a then checks an internal cache for open connections with client devices corresponding to receiving users from the list. That is, messaging server 320a reads the list of receiving users and checks the internal cache to determine if any of the receiving users are connected to messaging server 320a. A connected receiving user may be connected to messaging server 320a using a client device. In an embodiment, a user may be using more than one client device, such as, for example, a smart phone and a computer. Messaging server 320a will determine if the user is connected to messaging server 320a via any client device.

If a receiving user is connected, messaging server 320a will deliver the message to the receiving user's connected client device. This delivery allows for real-time distribution of messages.

In an embodiment, a receiving user may be utilizing more than one client device. If the more than one client devices are connected to the same messaging server 320, that messaging server will deliver the message to both client devices. If the client devices are connected to different messaging servers, each connected messaging server 320 will deliver the message.

If a receiving user is not connected to messaging server 320a, the messaging server 320a will store the message in messaging database 310. Messaging database 310 is a database such as a relational database. In an embodiment, messaging servers 320 may share the same messaging database 310. In an embodiment, multiple messaging databases 310 may be used by messaging system 300. Messaging servers 320 communicate with messaging database 310 using a database management system, such as, for example, MySQL®, PostgreSQL®, MongoDB®, or SAP HANA®.

Messaging server 320a will then continue to check if the receiving user connects to messaging server 320a. When a receiving user connects, messaging server 320a retrieves the stored message from messaging database 310 and delivers the message to the receiving user's connected client device.

In an embodiment, messaging server 320b may also execute the routine described with reference to messaging server 320a to determine if a receiving user's client device is connected to messaging server 320b.

FIG. 4 is a flowchart illustrating an embodiment of a method for delivering messages 400. Method 400 can be performed by processing logic that can comprise hardware (e.g., circuitry, dedicated logic, programmable logic, microcode, etc.), or software (e.g., instructions executing on a processing device). It is to be appreciated that not all steps may be needed to perform the disclosure provided herein. Further, some of the steps may be performed simultaneously, or in a different order than shown in FIG. 4, as will be understood by a person of ordinary skill in the art. Method 400 allows for the transfer of messages to multiple user clients while maintaining a centralized repository for messages.

At step 410, a message is generated at a local client, wherein the message is intended to be delivered to one or more receiving users. In an embodiment, a user of a messaging system utilizes a client device to send a message to a chat panel with other user subscribers. The user can utilize the client device to generate the message. For example, the user may type a text message, capture an image or video, or record an audio message. In this embodiment, the local client is the client device and the receiving users are the users subscribed to the chat panel to which the message is being sent.

At step 420, the message is transmitted to a first web server. A local client transfers the message to a web server using a web server access protocol, such as, for example Websockets®. In an embodiment, the message may be transmitted with a list containing the intended receivers of the message and/or an identification so that the web server can determine where to send the message. In an embodiment, the message may first be transmitted to a load balancer to determine a web server to receive the message.

At step 430, the message and listing of users meant to receive the message are transferred from the first web server to other web servers. The listing of users may be generated at a local client or at the first web server. For example, the first web server may receive a message intended for subscribers to a certain division or team. In that case, the first web server can generate a list based on the subscribers to those groups. In an embodiment, the first web server may analyze metadata associated with the message to determine the intended one or more recipients. For example, when a user utilizes a particular chat panel to generate a message, the local client may package the message with metadata indicative of the chat panel utilized. The first web server may then utilize this metadata to derive the list of users. In an embodiment, the first web server may fetch user data corresponding to the metadata from a messaging database to determine identifying information and/or determine a communication channel to deliver the message to the intended recipients. In an embodiment, the chat panel metadata may dictate the users who will receive the message.

In an embodiment, the message and list are transferred to all of the web servers connected in a messaging system. In an alternative embodiment, the message and list are transferred to a subset of the web servers in the messaging system. For example, the first web server may be able to determine which web servers have currently open sessions with receiving users. In that case, the first web server may transfer the message and/or list to the web servers with currently connected receiving users.

In an embodiment, a receiving user may have an open connection with the first web server. In that case, the message may not need to be sent to another web server depending on if there are other receiving users.

At step 440, a web server's internal cache is checked to determine if the web server is currently maintaining an open session with any receiving users. In an embodiment, the first web server checks an internal cache to determine if a receiving user is connected to the first web server. In an embodiment, the other web servers check their respective internal caches to determine if a receiving user has an open connection with the web server.

At step 450, a determination is made at each web server receiving the message and list as to whether a receiving user is connected. This determination may be made by comparing the list of receiving users with a list of active open sessions stored in the web server's cache. The building of this cache will be further described with reference to FIGS. 6A and 6B. If a session with a receiving user is open, method 400 executes step 460. If a session is not open, method 400 executes step 470.

At step 460, the message is delivered to a receiving user's client in response to determining that the receiving user has an open session with the web server. The delivery from the web server to a receiving user's local client may be accomplished using a web server access protocol, such as, for example Websockets®. Optionally, the web server may execute 470 and store the message in a database for archiving purposes.

At step 470, if no open session exists or after the execution of 460, the message is stored in a database. If step 470 is executed after step 450, the message may be stored until a session with a receiving user's local client is open. If a messaging system utilizes multiple web servers, the messaging system may store the message once or store multiple instances of the message. In response to detecting that a receiving user has opened a session, the message may then be retrieved from the database and delivered to the receiving user's local client.

FIG. 5 is a flowchart illustrating an embodiment of a method for managing message types 500. Method 500 may be executed in a messaging system to manage different types of messages, allowing for quick, real-time messaging while maintaining archival capabilities.

At step 510, a message is generated, wherein the message is intended to be delivered to one or more receiving users. In an embodiment, a user of a messaging system uses a client device to send a message to a chat panel with other user subscribers. The user can utilize the client device to generate a user message. For example, the user may type a text message, capture an image or video, or record an audio message. In this embodiment, the local client is the client device generating the message, and the receiving users are the users subscribed to the chat panel to which the message is being sent.

In an embodiment, an administrator may use a local client to generate the message. The message may be similar to a user message in content but may target a larger amount of receiving users. An administrator may also generate an alert message: a special message meant to more immediately capture a receiving user's attention relative to a user message. An alert message may appear more boldly when received by a receiving user's local client. For example, an alert message may overlay a screen, play an audio file, or flash a portion of a screen to more immediately capture attention.

In an embodiment, an application message may be generated at step 510. An application message is not a generated by a user client device or an administrator client device. Rather, an application message is a message generated by a messaging system. The application message may, for example, be a message that allows a receiving user to interact with or change the content of the messaging system. For example, if a user creates a new survey and identifies receiving users to participate in the survey, the messaging system generates an application message to notify the receiving user to complete the survey. This application message may also grant permission. Another example of an application message may be a notification that a user has been removed or added from a team or division.

At step 520, the type of message may be checked by a messaging system. If the message is a user message or an alert message, the message may be stored in a database at step 530. If the message is an application message, the message may be sent to the client.

At step 530, if the generated message type is a user message or an alert message, the message may be stored in a database. Storing the message in a database allows for archiving to keep a record of the message. In a regulatory context, such as compliance with regulations, or in a litigation context, such as for e-discovery, this archival feature will allow for quick reporting of relevant subject matter.

At step 540, the message is sent to the one or more receiving user clients. This message may be a user message, alert message, or application message. This message may be delivered via a connection between a messaging system and a local client device using a messaging protocol, such as, for example, Websocket®. If a user is idle (as explained further in FIG. 6A), a messaging server may use OneSignal to dynamically push in a multiplatform manner. In an embodiment, if a mobile device is the recipient of the message, a hybrid application, such as GoNative, may be used to send the message.

At step 550, the message may be received at a receiving user client and the document object model of the client may be updated. In an embodiment, a receiving user client is displaying a dynamically loading user interface. This interface may have be created using Ajax. In an embodiment, the document object model may be updated so that the graphical user interface display can be changed to display the message without requiring that the receiving user manually refresh the page.

FIG. 6A is a flowchart illustrating an embodiment of a method for managing user client states 600. User client states may dictate the delivery protocol of particular messages. In an embodiment, three user states may be relevant to a messaging system: active, idle, and disconnected. An "active" determination means that a user client is currently connected to a messaging system. The user client may be interacting with the messaging system by, for example, generating a message. In an embodiment, a user client may be deemed active if the client has interacted with the messaging system within a predetermined amount of time. The active status means that the client is maintaining an open session with the messaging system.

An "idle" determination means that the user client is still maintaining an open session with the messaging system but has not interacted with the messaging system within a predetermined amount of time. For example, the client may not have sent a message within the past 10 minutes and has thus become idle.

A "disconnected" determination means that the user client is no longer maintaining an open session with the messaging system. Method 600 allows for a determination of user status and provides a messaging algorithm in response to determining client status. In an embodiment, method 600 is executed on a web server or messaging server of a messaging system.

Figure 6B:
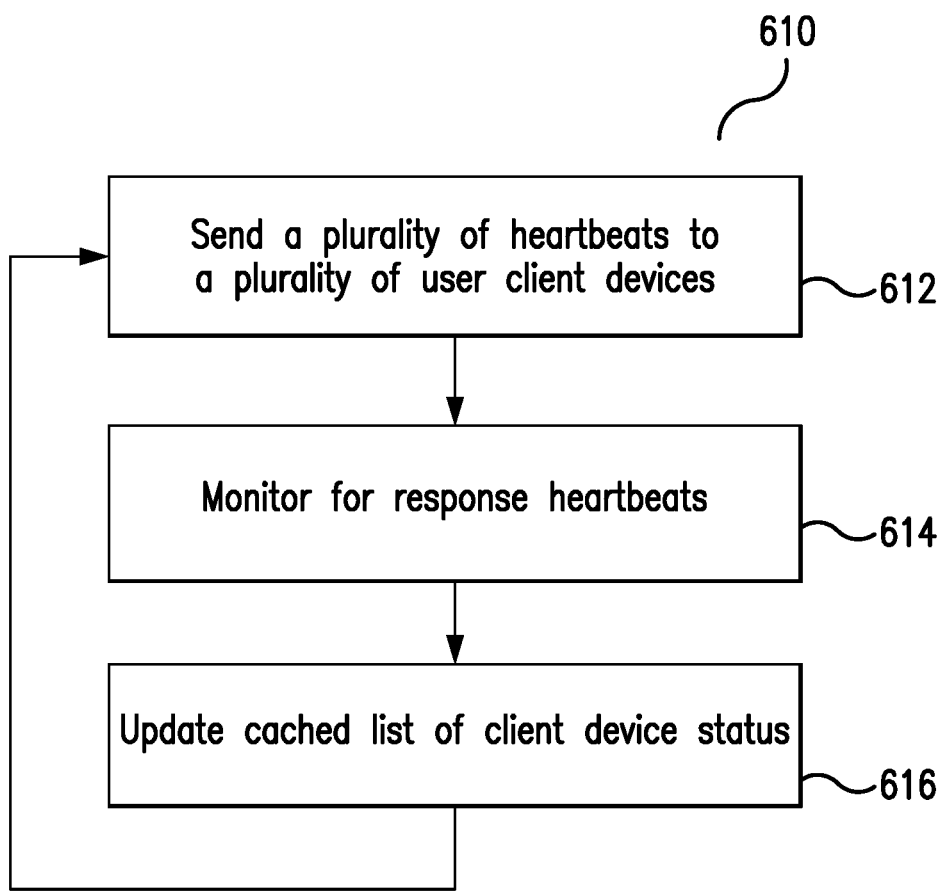
FIG. 6B is a flowchart that illustrates a method for building a list of open sessions, according to an embodiment.

At step 610, a list of open sessions is built. The description associated with FIG. 6B provides a more detailed embodiment of how the list of open sessions is built. In an embodiment, a cached list is created and updated by periodically checking the status of connected clients. The list may maintain client status as "active," "idle," or "disconnected."

At step 620, a message is received, wherein the message is intended for one or more receiving users. The message received may contain identification information related to one or more receiving users and/or be sent with a list of receiving users. In an embodiment, the message may be received from a client device. The client device may generate a message that is to be sent to a receiving user. In an embodiment, the message may be an application message, generated and received from an application instantiating chat panels or from the messaging system. The message may be received at a web server or messaging server.

At step 630, the list built in step 610 is checked to determine if one or more receiving users are maintaining an open session. In an embodiment, the identifying information received with the message is compared to the list built. For example, a message may be intended for a user X. The message may contain information identifying user X or the message may be accompanied by information identifying user X. Once the message is received at, for example, a web server or messaging server, the server will check its built list of open sessions to determine if user X currently has an open session with the server. In an embodiment, user X may use more than one client device, meaning that user X may have more than one open session with the server.

At step 640, the determination is made concerning whether a receiving user client device is currently maintaining an open session. In an embodiment, the open session determination is made by determining if a receiving user client device is currently in an active state or in an idle state. If a session is open or if the receiving user device is currently connected to a messaging system, method 600 will execute step 660. If no sessions are open or if a determination that the client status is "disconnected," method 600 will execute step 650.

At step 650, the message received is stored in a database if no sessions are open with a receiving user. In an embodiment, the message is stored in a database by a server using a database management system, such as, for example, MySQL®, PostgreSQL®, MongoDB®, or SAP HANA®. In an embodiment, the message may be retrieved from the database and delivered to a receiving user when it is determined that the receiving user has connected to the messaging system by creating an open session with a client device.

At step 660, the message is sent to the client as a result of determining that the client is maintaining an open session. This message may be delivered via a connection between a messaging system and a local client device using a messaging protocol, such as, for example, Websocket®.

In an embodiment, method 600 may be executed on a messaging server in a messaging system. That is, a messaging system may include one or more messaging servers configured to execute method 600. In this case, each messaging server may execute the elements of method 600, such as building a list of open sessions, receiving a message intended for one or more receiving users, and checking the built list to determine if the server is currently maintaining an open session with one or more receiving users client devices. Each messaging server will then make a decision based on whether an open session is maintained. In an embodiment where a receiving user is utilizing more than one client device to receive a message, more than one messaging server in the messaging system may utilize method 600 to deliver the message to all of the receiving user's client devices with open sessions.

FIG. 6B is a flowchart illustrating an embodiment of a method for building a list of open sessions 610. In an embodiment, method 610 is a subroutine of the method 600 as depicted and described with reference to FIG. 6A. Method 610 may be executed on a messaging server to determine the status of various connected client devices.

At step 612, a plurality of heartbeats is sent to a plurality of user client devices. In an embodiment, a heartbeat is a signal used for checking the status of the user client device. A heartbeat may be generated by a heartbeater, such as, for example, the Websocket® ping pong frame system. The heartbeater may be implemented using a messaging server in a messaging system.

At step 614, the sent heartbeats may be monitored to determine if any response heartbeats are received. In an embodiment, a messaging server may determine if a signal is sent from the client device to the messaging server in response to the client device receiving a heartbeat. If a messaging server receives a return heartbeat, the messaging server can determine the status of the client device. For example, the messaging server may determine whether the client device is active or idle. If the messaging server does not receive a response heartbeat or has determined that no heartbeat response has been returned within a predetermined period of time, the messaging server may determine that the client device is disconnected.

At step 616, based on the response received or lack of response received, a cached list of client device statuses may be updated. In an embodiment, the cache is stored in memory accessible by a messaging server. A messaging server will update the cache as information regarding client device status is received. For example, if a heartbeat is sent to a first client device, and the first client device returns an idle status or information allowing a messaging server to determine that the first client device is idle, the messaging server may utilize the received information to update a list of client devices and mark the idle client device as idle. The list may be updated with any devices that were sent a heartbeat.

In an embodiment, method 610 may periodically check the status of client devices at a predetermined time interval. In an embodiment, a messaging system may execute method 610 on one or more messaging servers. In an embodiment, every messaging server may check every client device of users subscribed to any of the chat panels of the messaging system. In an embodiment, client devices may be assigned to particular messaging servers, such that a messaging server will only need to check session status information of those client devices to which it is assigned.

FIGS. 7-18 are diagrams of graphical user interfaces allowing users to send and receive messages. The graphical user interfaces provide a visual representation of the associated functional aspects of chat panels. The graphical user interface facilitates receiving inputs from a user as well as displaying messages to the user. In an embodiment, the graphical user interface is a web-based graphical user interface, and can be accessed via any of the common web browsers, such as Internet Explorer, Firefox, Safari, Chrome, etc. In an embodiment, the graphical user interface is an application that runs on a device such as a laptop, computer, a smart phone, or a tablet. Because users subscribed to a chat panel may use multiple client devices, the graphical user interface may display on each of the client devices.

FIG. 7 is a diagram that illustrates a graphical user interface (GUI) 700 displaying a company chat panel 710, according to an embodiment. FIG. 7 is an example interface enabling a user to view a message sent to the entire company. An administrator may send the message on the company chat panel 710, and a subscribing user may receive the message from the administrator. In an embodiment, a user who is not an administrator will not be able to send messages to the "company" chat panel.

FIG. 7 also depicts a user view 720, listing various chat panels. These chat panels may be grouped by "division" or "team" and represent various communication groups. A user may be subscribed to a division or team and be able to access the corresponding chat panel by selecting a desired division or team.

FIG. 8 is a diagram that illustrates a GUI 800 displaying a division chat panel 810, according to an embodiment. FIG. 8 is an example interface enabling a user to interact with a chat panel 810. In an embodiment, the user is subscribed to the "accounting" division and may receive messages from the accounting chat panel 810. For example, the user may select the "accounting" division from a list of divisions 820. The graphical user interface may then display a chat panel 810 corresponding to the "accounting" division. The chat panel 810 may display messages from administrators of chat panel 810. In an embodiment, an administrator of a division may utilize chat panel 810 to deliver announcement messages to subscribers of chat panel 810.

FIG. 9 is a diagram that illustrates a GUI 900 for team chat panel selection, according to an embodiment. FIG. 9 is an example interface enabling a user to create a new team or search for a team. GUI 900 may include a team generation panel 910. A user may search for a team by searching for the name of the team. The user may utilize search bar 920 to search for a team. In an embodiment, the user may only be able to search for teams that are publicly available to others in a company. The user may also create a team using team creation button 930. Creating a team allows a user to customize a chat panel with specific user subscribers. For example, a user may choose the name of a team and/or members to invite to the team.

FIG. 10 is a diagram that illustrates a GUI 1000 displaying multiple chat panels 1000A-1000D, according to an embodiment. FIG. 10 is an example interface enabling a user to view many subscribed chat panels 1000A-1000D. The display of the chat panels 1000A-1000D allows a user to quickly review relevant information as well as quickly send messages as needed to different divisions or teams. For example, chat panels 1000C and 1000D for "QA" and "Sales" may be instantiated in the same graphical user interface, allowing a user to view messages corresponding to both groups simultaneously. The user will also be able to send a message to one group while receiving a message from the other group.

FIG. 11 is a diagram that illustrates a GUI 1100 for selecting a private message chat panel, according to an embodiment. FIG. 11 is an example interface enabling a user to start a private conversation. A private conversation chat panel may be used for one-on-one chat functions between users. In an embodiment, a user may search for a user to initialize a private conversation chat panel using a private message search bar 1110. Once a user is found, the found user may be saved to a list 1120 of other found users to allow quick identification of users for private conversations. In an embodiment, the graphical user interface associated with private conversation chat panel may appear similar to the chat panels for divisions or teams. In an embodiment, the chat panel for a private conversation only supports two subscribed users.

FIG. 12 is a diagram that illustrates a GUI 1200 for survey access, according to an embodiment. FIG. 12 is an example interface enabling a user to create a survey and/or respond to a survey request. Surveys may correspond to various work and/or non-work related topics. For example, surveys may correspond to employee evaluations, employee availability, and/or employee feedback.

When creating a survey, a user may specify which users are meant to participate and to respond to the survey. Users may utilize a survey creation button 1210 to create a survey.

The survey may also be conducted anonymously to allow for more truthful replies. In an embodiment, if a user has been designated to respond to a survey, the user may be notified via the survey panel and prompted to provide answers.

Users may also search available surveys to complete. In an embodiment, the user may utilize a survey search bar 1220. In an embodiment, the user may be able to participate in public surveys and provide feedback. In an embodiment, some surveys may be protected and, while available for viewing, do not allow uninvited participants to provide responses. Users, however, may search for protected surveys and view the questions asked and/or responses recorded. In an embodiment, these responses may be anonymous.

FIG. 13 is a diagram that illustrates a GUI 1300 for customizing members of a division, according to an embodiment. FIG. 13 is an example interface enabling an administrator to customize the members of a division. This function may only be available to an administrator to generate mandatory divisions as well as prevent user tampering. The administrator may utilize this GUI 1300 by entering names or email addresses corresponding to users to add to the divisions. In an embodiment, a user may select users from a list and/or input users using a search bar 1310. For example, if the user is meant to be added to the "Developers" division, an administrator may enter the name of the user to be added. In an embodiment, a list of users may be stored in a database. When an administrator attempts to add a user, a messaging system may search a database for the corresponding user to aid in adding the user.

In an embodiment, when an administrator adds a user to a division, the user is mandatorily subscribed to the division and will receive messages from administrators of the division.

FIG. 14 is a diagram that illustrates a GUI 1400 for customizing the display of the graphical user interface, according to an embodiment. FIG. 14 is an example interface enabling an administrator to customize the display of the graphical user interface. For example, the administrator may change the name of the company using name editor 1410, enter email domain names using domain editor 1420, change the logo of the company using logo editor 1430, and/or manage the administrators using administrator editor 1440.

FIG. 15 is a diagram that illustrates a GUI 1500 for managing contacts, according to an embodiment. FIG. 15 is an example interface for adding contacts to the messaging system and/or viewing contact information. These contacts may be from inside or outside of the company, allowing more flexibility for interaction with the chat panels. In an embodiment, adding contacts may be a graphical user interface layer 1510 existing on top of instantiated chat panels. If the contact to be added is external to the company or organization, the messaging system may require the user to add additional contact details, such as, for example, an address, phone number, location, and/or other identifying information. If a user is accessing the contacts interface to search for an already added user, the messaging system searches a database for the already added user. The database may then return the desired contact information corresponding to that user.

Figure 16A:
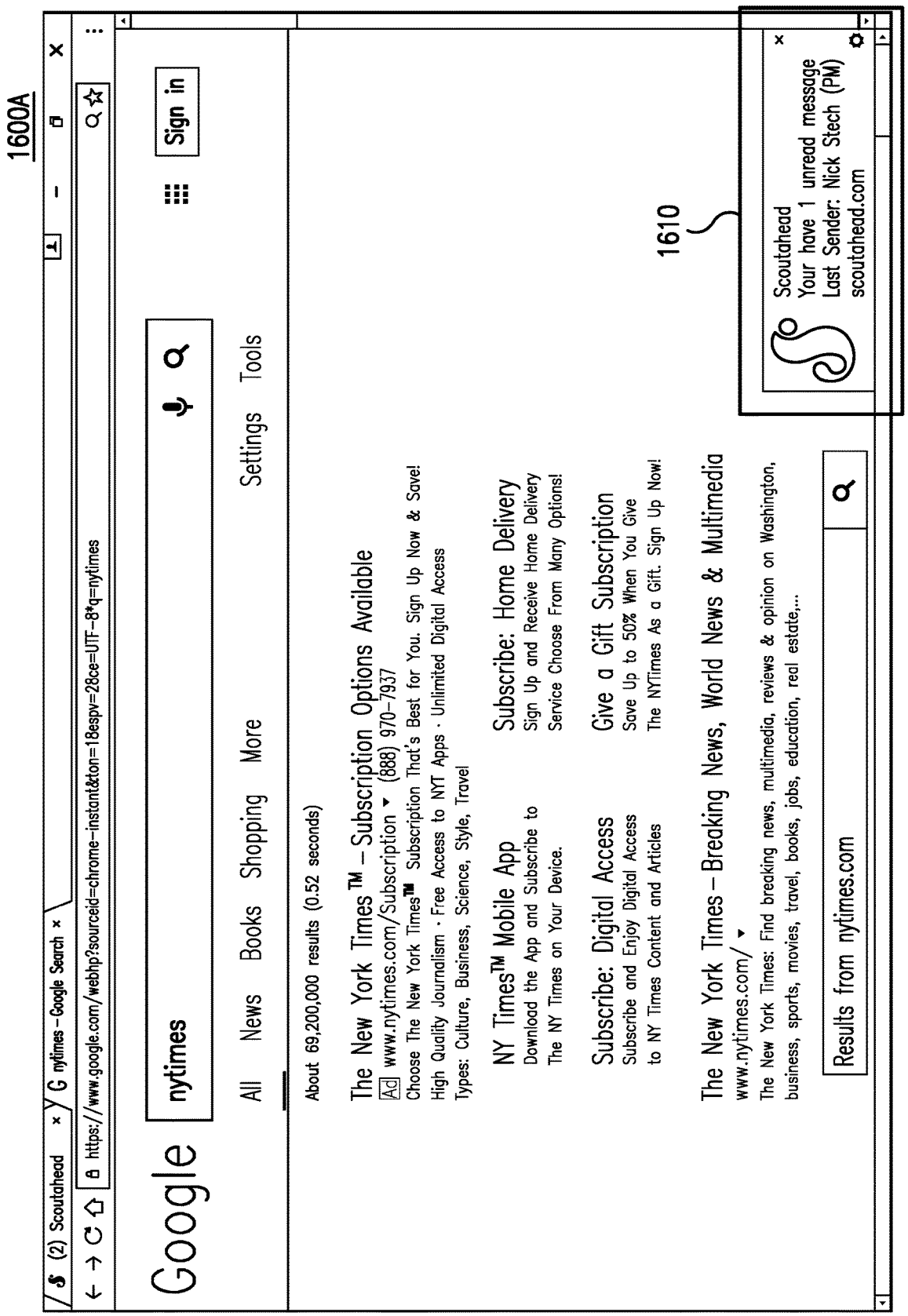
FIG. 16A is a diagram that illustrates a graphical user interface displaying a notification, according to an embodiment.

FIG. 16A is a diagram that illustrates a GUI 1600A displaying a notification, according to an embodiment. FIG. 16A is an example interface showing a pop-up notification 1610. A user may be browsing a different website, independent of a messaging system, and receive a pop-up notification 1610 alerting the user that the user has received a message. The notification may also include additional information such as which chat panel generated the message, the sending user, and/or the time of the message. In an embodiment, users may be able to customize how the pop-up notification 1610 is displayed. For example, the user may indicate a location in a web browser to display the pop-up notification 1610. The user may also indicate whether a sound or audio file should also be played in addition to the visual notification.

Figure 16B:
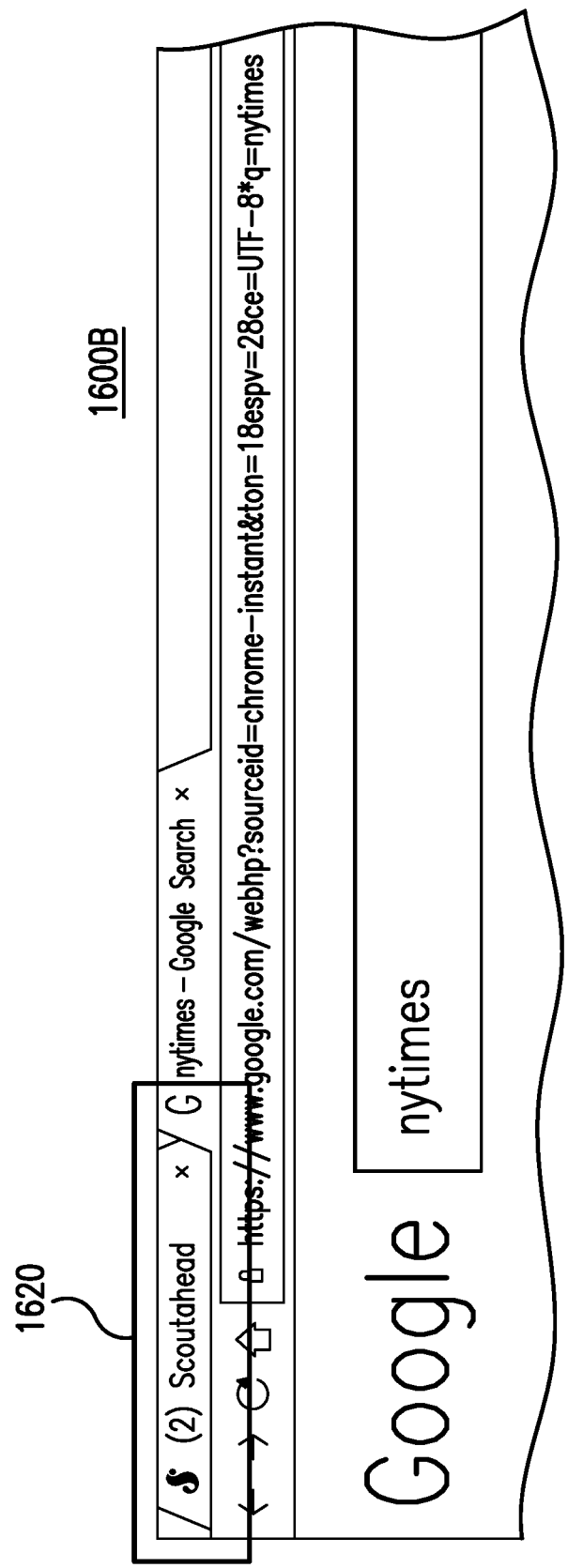
FIG. 16B is a diagram that illustrates a graphical user interface displaying a browser tab notification, according to an embodiment.

FIG. 16B is a diagram that illustrates a GUI 1600B displaying a browser tab notification 1620, according to an embodiment. FIG. 16B is an example interface showing a browser tab notification 1620. A user may be browsing a different website and receive a browser tab notification 1620 alerting the user that the user has one or more unread messages. The browser tab notification 1620 may also identify the number of messages received.

Figure 17:
FIG. 17 is a diagram that illustrates a graphical user interface for editing user contact information, according to an embodiment.

FIG. 17 is a diagram that illustrates a GUI 1700 for editing user contact information, according to an embodiment. FIG. 17 is an example interface enabling a user to edit their own personal contact information. The user may upload an image to use as a profile picture using profile picture editor GUI 1710 and/or edit personal information using personal information editor GUI 1720. This personal information may include a name, phone number, and/or location.

FIG. 18 is a diagram that illustrates a GUI 1800 for toggling notifications, according to an embodiment. FIG. 18 is an example interface enabling a user to turn off notifications. In an embodiment, a user may utilize a notification toggle button 1810 to turn notifications on or off. This feature may be applicable to one or more chat panels and prevent the user from receiving notifications. Even if the user has chosen not to receive notifications, the user will still be able to access chat panels and send and/or receive messages. The user may choose to receive notifications at a later time. In an embodiment, the user may turn off notifications for a predetermined amount of time rather than indefinitely.

FIG. 18 also demonstrates a private messaging interface 1820 between two users, User A and User I. In an embodiment, colors may be used to highlight urgent messages.

FIG. 19 is a diagram that illustrates a GUI 1900 integrating chat messaging features and email messaging features. GUI 1900 displays a view that may be displayed on a client device, implementing messaging features related to simultaneously displaying chat messages and email messages. For example, one or more users 220 may utilize messaging system 200 as depicted in FIGS. 2A-2B and chat panels 210 to message other users 220 utilizing messaging system 200. In an embodiment, the users 220 may wish to communicate with external individuals that do not have access to messaging system 200. While not being able to utilize messaging system 200, external individuals may have email access and/or a corresponding email address. Messaging system 200 may accept and/or generate emails to communicate with these external individuals. When receiving external emails, messaging system 200 parses the emails, identifying external individuals as well as users 220 of messaging system 200. Messaging system 200 may also hide certain repetitious portions of email threads based on the parsing. In an embodiment, messaging system 200 displays the email and/or email thread using a chat panel 210. This chat panel may allow recipients to communicate via email while displaying the email as a chat interface. In an embodiment, external individuals may receive response emails from users 220 while users 220 of messaging system 200 may receive responses in the form of chat messages. FIG. 19 provides an embodiment of GUI 1900 which displays the integration of an email message with the chat features of messaging system 200. GUI 1900 depicts a display that may be utilized by user 220 to interact with chat messages as well as email messages.

GUI 1900 includes a hierarchical messaging interface 1910. Hierarchical messaging interface 1910 may be a minimized version of the menu displayed with reference to FIGS. 7-10 and may allow a user to select between different chat panels. In an embodiment, hierarchical messaging interface 1910 allows a computer system to implement the hierarchy displayed in FIG. 1A. In an embodiment, hierarchical messaging interface 1910 allows a user to select between chat panel messaging features and email messaging features. For example, a user may browse chat panels to which the user is subscribed and/or browse email threads.

GUI 1900 also includes an email tab 1920, which lists emails directed to the user of GUI 1900. Email tab 1920 may provide a list of emails and/or groups of emails on a subject directed to the user and may display a preview of the email. Email tab 1920 may also display information related to the sender of the email. Using email tab 1920, the user may select between different emails in a manner similar to selecting between different chat panels.

When a user selects an email to view, either by opening email tab 1920 or by selecting a specific email in email tab 1920, GUI 1900 may display email panel 1930. Email panel 1930 may operate in a manner similar to a chat panel. Email panel 1930 may display various messages from participants of the email. Email panel 1930 may display responses to email threads, grouping responses by the individual that has provided the response. Email panel 1930 may remove repetitious messages, instead displaying responses to an email chain as chat messages. In an embodiment, messaging system 200 receives an email from an individual that does not have access to the messaging features of messaging system 200. In this embodiment, messaging system 200 parses the content of the email to extract sender and recipient information as well as duplicative message content to discard. In this manner, messaging system 200 may display recent responses, removing clutter from repetitious messages and display each response as a separate graphical area of email panel 1930.

For example, when messaging system 200 receives an email, messaging system 200 may display the most recent message content in an email response area 1933. Email panel 1930 may populate with many email response areas 1933 as more responses are received related to the email thread. In an embodiment, if a user utilizing GUI 1900 sends a response, email panel 1930 also displays the user's response as a separate email response area 1933. In an embodiment, email response area 1933 also displays the sender of the email, the time the email was sent, and/or the time the email was received. Users may also interact with email response areas 1933 to delete, hide, and/or edit email messages. For example, users may make notes regarding certain email responses using email response areas 1933. Although the population of the most recent email responses on email panel 1930 may eliminate the need to view repetitious information, a user may select an email response area 1933 to view the full email and/or a parsed version of the full email displaying more information.

In an embodiment, email panel 1930 may distinguish between users utilizing messaging system 200 and individuals external to messaging system 200. Email panel 1930 may employ visual distinctions such as visual indicators and/or colors to indicate that an email response area 1933 corresponds to a user authorized to use messaging system 200 and/or an external individual. This visual component may include personal identification information, such as, for example, a photograph of a user.

In an embodiment, GUI 1900 may support a tagging feature, allowing for identification and alerting of users of messaging system 200. For example, a tag 1935 "@User K" may be utilized in a response to directly link a user's profile and/or notify the tagged user that the tagged user has been mentioned in a response. For example, a response generated by User M may tag User K using a tag 1935 associated with User K's name. Messaging system 200 may recognize tag 1935 and link to User K's profile and/or may generate a notification for User K. In an embodiment, a tag 1935 may invite User K to join the email thread, allowing User K to view the email thread displayed in email panel 1930 and/or provide a response to the email thread. In an embodiment, tag 1935 may allow users to view other emails that have tagged User K and/or view responses that User K has generated. In an embodiment, tag 1935 may apply to users of messaging system 200 and/or external individuals. For example, tag 1935 may be utilized to track messages received from external individuals across multiple email threads.

As email panel 1930 is populated with more email responses and email response areas 1933, email panel 1930 may allow a participant of the email to provide a response using response area 1937. A user may utilize response area 1937 to generate a response chat message and/or response email to one or more of the individuals of the email thread. As explained further with respect to FIG. 20, the user may choose to respond in a message form and/or an email form. Response area 1937 may allow for chat-like responsiveness when communicating via email, expediting communications between users of a messaging system 200, which may predominantly utilize chat messaging features, and external individuals, which may predominantly utilize email messaging features. Response area 1937 may provide a user with text formatting tools as well non-text features, such as, for example, images, videos, audio, and tables to include in a response. Response area 1937 may also include an upload feature for uploading files to a response chat message and/or email. Users may selectively choose whether to send uploaded files to only users of messaging system 200 or to both users and external individuals.

If a response is intended for a user of messaging system 200 as well as an external individuals, messaging system 200 may identify the permissions associated with each recipient, preserving chat features for users of messaging system 200 and possibly restricting portions of the message to external individuals. For example, messaging system 200 may deliver a link to an internally stored image or document to a user when the image or document is referenced in the response but may deliver the image or document file to an external individual. This integration allows for quick communication and delivery of responses to both users of messaging system 200 as well as external individuals.

In an embodiment, response area 1937 may also display a status related to a user of messaging system 200 and a participant of the email thread, indicating that the user is typing. By monitoring inputs into response area 1937, messaging system 200 may determine when users are typing and display this information to other participants of the email.

In an embodiment, response area 1937 may also include a search feature, allowing a user to search through previous email responses. The user may select the option an input a desired search term. Messaging system 200 may filter email response areas 1933 to display those which include the desired search term or similar terms.

FIG. 20 is a diagram that illustrates a GUI 2000 integrating chat messaging and email messaging response features. As described with reference to FIG. 19, an email panel 1930 displaying email response may include a response area 1937. GUI 2000 also depicts an email panel displaying a response area 2015 as well as a response type interface 2010. Response area 2015 operates in a manner similar to response area 1937.

In an embodiment, response type interface 2010 allows a user to select the manner with which to respond. For example, the user may select a chat message response and/or an email response. In an embodiment, if a user selects a chat message response and submits a response using response area 2015, messaging system 200 may deliver the response to users of messaging system 200 but not to external individuals. In this embodiment, confidentiality may be preserved, allowing users of messaging system 200 to communicate discreetly while still utilizing a single email panel. That is, if the users wish to communicate with each other and without the external individuals, the users may utilize the chat message response option and need not utilize a separate chat panel for communications.

If the user wishes to reply to all of the participants, the user may select to send the response as an email. This option also allows the user to utilize email features, such as selecting participants, removing participants, and/or adding new participants. This features also allows for blind carbon copying.

GUI 2000 also display other features related to email panels and email response areas. For example, email response area 2020 displays an embodiment of a visual indicator useful for distinguishing between user responses and external individual responses. For example, email response area 2020 may include a broken-line border to indicate that the response associated with email response area 2020 was received from an external individual. Other visual indicators, such as colors, shapes, patterns, objects, and/or text may also be utilized to distinguish between responses from a user of messaging system 200 and an external individual.

In an embodiment, email response area 2030 may include an alert. An alert may indicate urgency and/or importance and may be visually distinguished from other email response areas. In an embodiment, an email participant may include an alert associated with a response provided to messaging system 200. Messaging system 200 may identify the alert when parsing the email and display the response with a unique visual indicator associated with the alert. For example, messaging system 200 may utilize colors, shapes, patterns, objects, and/or text to distinguish email response area 2030 from other email response areas, indicating an alert. In an embodiment, email response area 2030 may utilize motion, such as a blinking display, to distinguish itself. In an embodiment, the recipient of a response may choose to associate an alert with the response. For example, email response area 2030 may appear to be the same as other email response areas until the recipient of the message decides to attach significance to email response area 2030. The recipient may interact with email response area 2030 to generate a visual marking of email response area 2030, such as by using colors, shapes, patterns, objects, and/or text. In an embodiment, this marking may serve as a reminder for the recipient to follow-up with the received message.

In an embodiment, email response area 2040 may include a tag. The tag may be tag 1935 as described with reference to FIG. 19. In an embodiment, email response area 2040 may be visually distinguished from other email response areas when a tag is present within email response area 2040. Email response area 2040 may be visually distinguished using colors, shapes, patterns, objects, and/or text. In an embodiment, when a tag appears, email response area 2040 may be visually distinguished. In an embodiment, different visual indicators may correspond to different tags. For example, when User K is tagged, email response area 2040 may be the color blue, but when User M is tagged, email response area 2040 may be the color green.

In an embodiment, email response area 2040 may be visually distinguished when the user utilizing GUI 2000 is tagged. For example, the default color for email response areas may be white and the user utilizing GUI 2000 may be User X. When User K and User M are tagged in responses, the email response areas containing the tags may still remain white. When User X is tagged in a response, however, email response area 2040 may change to a yellow color. By visually distinguishing email response areas where the user of GUI 2000 is tagged, the user can quickly see where the user was mentioned, identify information relevant to the user, and determine if any follow-up response or action is needed.

FIG. 21 is a diagram that illustrates a GUI 2100 displaying group communication, according to an embodiment. GUI 2100 includes a hierarchical messaging interface 2110 that operates in a manner similar to hierarchical messaging interface 1910 as described with reference to FIG. 19. Hierarchical messaging interface 2110 may be a minimized version of the menu displayed with reference to FIGS. 7-10 and may allow a user to select between different chat panels, including division, team, and/or private message chat panels. In an embodiment, hierarchical messaging interface 2110 allows a user to select a group chat menu 2120 for messaging as described with reference to FIGS. 1A-1B and 8-9.

Group chat menu 2120 may be a portion of GUI 2100 which allows a user to select between different divisions and/or teams to which the user is subscribed. In an embodiment, the user may utilize hierarchical messaging interface 2110 to select divisions to be displayed in group chat menu 2120. In an embodiment, the user may utilize hierarchical messaging interface 2110 to select teams to be displayed in group chat menu 2120. Based on the user selection, a messaging system may populate group chat menu 2120 with different links to different divisions and/or teams. The user may then select a division or team to view using GUI 2100. In an embodiment, a selection of a division or team allows the user to view chat messages and emails associated with the selected division or team. The chat message and email interaction will be described in further detail with reference to FIG. 22.

In addition to displaying chat messages and/or emails in response to a division or team selection, GUI 2100 may also display a group member panel 2130. Group member panel 2130 may be a portion of GUI 2100 listing the members of the selected division or team. For example, a user may utilize group chat menu 2120 to select the "Software Development" team. Group member panel 2130 then displays the members of the Software Development team. In an embodiment, group member panel 2130 may display the members of a team or division in a member status list 2133. Member status list 2133 may show profile information of users subscribed to the selected team or division. In an embodiment, member status list 2133 also includes an activity status indicator for each user. For example, a particular member's status may indicate that the user is online, available to chat, offline, and/or has been idle for a certain amount of time. A visual indicator such as a colored circle and/or a timestamp in member status list 2133 may provide the status indication.

In an embodiment, group member panel 2130 may also list the name of the currently selected division or team and/or may include a search feature. This search feature may allow a user to identify a particular member of the team to send a private message and/or view the particular member's profile. The search feature may also allow a user to search through the contents of messages and/or emails associated with the selected division or team.

In an embodiment, group member panel 2130 may also include a member addition interface 2135. Member addition interface 2135 may allow an administrator or a user subscribed to a division or team to add more members to the division or team. In an embodiment, the administrator or user may begin typing in a name and member addition interface 2135 may populate with a best estimate of the user to be added.

In an embodiment, when a user has selected a team using group chat menu 2120, GUI 2100 may display communication interface 2140. Communication interface 2140 may display chat messages and/or emails associated with the selected team. In an embodiment, communication interface 2140 may operate in a manner similar to a chat panel as described with reference to FIGS. 2A-2B. Communication interface 2140 may display the chat messages and may convert emails to a format compatible with the chat messages such that users can read communications as if they were chat messages. In an embodiment, when a member of a team sends a message, the member may select whether to send the message as a chat message or as an email. Based on the selection, the underlying messaging system (e.g., messaging system 200) may parse the message, delivering a chat message to other users of the messaging system while delivering an email to external individuals. In an embodiment, this selection may allow confidentiality within a team when a user chooses to only send a message to other members of the team. This configuration may allow quick messaging without the need for members of a team to generate a separate email to convey messages to other members of the team. In an embodiment, users need not utilize a separate chat panel to communicate with the members of the team. Users may view emails sent to the team concurrently with internal chat messages generated by the members of the team using communication interface 2140.

FIG. 22 is a diagram that illustrates a graphical user interface integrating (GUI) 2200 chat messaging and email messaging for group communication, according to an embodiment. Similar to GUI 2100, GUI 2200 may be utilized to facilitate group communications, such as communication between members of a team. Users may utilize hierarchical messaging interface 2210 to select a group chat menu 2220. Hierarchical messaging interface 2210 may include options such as divisions, teams, and/or private messages. In an embodiment, a user may select the "Team" option of hierarchical messaging interface 2210. GUI 2200 may then populate group chat menu 2220 with different links to different teams to which the user is subscribed. If the user selects a team, such as "Software Development," GUI 2200 may also generate a group member panel 2230, which displays the members of the team. Group member panel 2230 may also include status information related to the members of the team. Upon selection of a team, GUI 2200 may also populate communication interface 2240 with chat message and/or emails related to the selected team.

In addition to these features, GUI 2200 provides an email interface 2225. A user using GUI 2200 may maintain a separate email address and associated account that may be displayed in email interface 2225. In an embodiment, the user may utilize email interface 2225 to view personally addressed emails that have not been addressed to the displayed division or team. In an embodiment, a user may view an email by selecting the email on email interface 2225. In this embodiment, the email may be viewed in a chat display similar to the embodiment described with reference to FIG. 19. This embodiment may allow a user to quickly navigate between email threads and group messages associated with a division or team.

When a user views group messages related to a division or team, GUI 2200 may display the messages in communication interface 2240. Communication interface 2240 may be a portion of GUI 2200 configured to display chat messages concurrently with email messages. In an embodiment, communication interface 2240 may organize the messages based on a time the most recent chat message or email message was received. In an embodiment, communication interface 2240 may segregate chat messages and email messages into different portions. In an embodiment, communication interface 2240 may distinguish between chat message and email messages using visual indicators such as colors, shapes, patterns, objects, and/or text.

In an embodiment, based on the group messaging nature displayed using GUI 2200, communication interface 2240 may display multiple chat threads and/or email threads 2245. For example, communication interface 2240 may display email thread 2245A and email thread 2245B. In an embodiment, email threads 2245A and 2245B may be email threads addressed to the team or division. For example, email threads 2245A and 2245B may be email threads addressed to a Software Development team. By displaying these email threads 2245, communication interface 2240 may allow division or team members to select different email threads 2245 and provide responses specific to those threads. The email threads 2245 may be topical and/or may be organized by the individuals addressed. In an embodiment, a user may select an email thread 2245 to view the email thread as a chat conversation. For example, when a user selects email thread 2245A to view, communication interface 2240 may be replaced with an email panel 1930 as described with reference to FIG. 19.

In an embodiment, an email thread 2245, such as email thread 2245C, may be minimized and may include an expand button 2250. By selecting the expand button 2250, a user may view the underlying email thread 2245C in an expanded chat message form as described with reference to FIG. 19. In an embodiment, when a user expands selected email thread 2245C, communication interface 2240 may expand the message to display over a larger portion of communication interface 2240 relative to the unexpanded display of email thread 2245C. In an embodiment, communication interface 2240 may display an email thread 2245 using a plain text format. When a user expands a selected email thread 2245, communication interface 2240 may display the email message using a rich text format. In an embodiment, a user may utilize a rich text button 2260 to toggle viewing chat messages and/or email threads in a plain text format or a rich text format. In an embodiment, the user may utilize rich text button 2260 to select whether to submit a response chat message or response email message in a plain text or a rich text format.

In an embodiment, a user may respond to a team using a personally addressed email stored in email interface 2225. For example, a user may share a received email with other members of the team. In an embodiment, the user may drag and drop an email displayed in email interface 2225 into communication interface 2240. The underlying messaging system may recognize this interaction as a command to share the selected email with other members of the team. The messaging system may then format the shared email such that the responses may be viewed in a chat format. Other users may utilize GUI 2200 to view the shared email as an email thread 2245 and may expand the email thread 2245 to view the shared email. In an embodiment, the expansion may display the email thread 2245 in an email panel 1930 as described with reference to FIG. 19. In an embodiment, other users may utilize GUI 2200 to view the shared email in communications interface 2240 in an expanded form whereby the email takes up a larger portion of the communications interface 2240 relative to the unexpanded form.

FIG. 23 is a diagram that illustrates a GUI 2300 integrating chat messaging and email messaging for private communication, according to an embodiment. GUI 2300 may be utilized by users communicating with other users individually. In an embodiment, this private communication may be a one-on-one messaging scheme. GUI 2300 may include hierarchical messaging interface 2310, similar to the hierarchical messaging interfaces described with reference to FIGS. 21 and 22. A user may select between divisions, teams, and/or private messages to view using hierarchical messaging interface 2310.

In an embodiment, the user may select to view private messages. GUI 2300 may display private chat menu 2320 in response to the user's selection. Private chat menu 2320 may include a list of individuals that the user may initiate private messaging. The user may also resume previously initiated private messaging with individuals listed in private chat menu 2320. When a user selects an individual from private chat menu 2320, GUI 2300 may populate communication interface 2340 with the private messages exchanged between the user and the selected individual. Communication interface 2340 may be a portion of GUI 2300 that displays messages and/or emails and allows a user to generate new message and/or email responses.

In an embodiment, communication interface 2340 is configured to display chat messages as well as email messages. In the private message context, users may initially send chat messages back and forth. In some cases, however, a user may be unable to access the chat message feature but may have access to an email account. In this case, the user may send an email addressing the other user. An underlying messaging system may receive this email and/or parse the email. Parsing may include recognizing that the email message is a private message. In an embodiment, the messaging system may recognize that the email message is private based on having only a single recipient. In this case, the messaging system may parse the email and display the email on communication interface 2340 to the user with access to the chat features. This display will allow the user with access to the chat features to continue chatting with the user without access. In an embodiment, the user with access may still view the private messaging in a chat format while the user without access may receive an email response generated by the messaging system. In an embodiment, communication interface 2340 may include a visual indicator that distinguishes an email message from a chat message. For example, communication interface 2340 may use colors, shapes, patterns, objects, and/or text to distinguish email messages from chat messages.

In an example embodiment, GUI 2300 may depict a private message communication between User X and User B. In this embodiment, GUI 2300 is displayed on a device accessible to User X. User X may select the private message option from hierarchical messaging interface 2310. This selection may allow GUI 2300 to display private chat menu 2320, which lists User B. This listing may indicate that User X may be able to start a messaging communication and/or resume a messaging communication with User B. After User X selects User B, communication interface 2340 may populate with messages that have been exchanged between User X and User B. For example, chat message 2341 may be chat message sent by User B. Similarly, chat message 2342 may be a chat message sent by User X.

In an embodiment, User B may decide to provide a response using an email message. For example, User B may send User X an email with User X as the sole recipient. User B may decide to send an email in response to losing access to an underlying messaging system instantiating GUI 2300 or may decide that sending an email is more convenient. In this case, the underlying messaging system may receive the email and determine that the message is intended for User X. After this determination, the messaging system may output the email message 2343 to communication interface 2340 of GUI 2300, allowing User X to view the contents of the email message. In an embodiment, email message 2343 may include a visual indicator that differs from chat messages 2341 and 2342. For example, email message 2343 may include a differently colored background. This visual indicator may signal to User X that User B has responded using an email message. In an embodiment, GUI 2300 may display email message 2343 in a plain text format. User X may interact with email message 2343 to expand the message, enabling rich text format. Based on these embodiments, GUI 2300 may display an interwoven chat message and email message thread. This integration allows for a single GUI to display both types of messages, thus relieving a user of the burden of needing to switch between different messaging interfaces.

FIG. 24 is a diagram that illustrates a workspace GUI 2400, according to an embodiment. Workspace GUI 2400 may be a display generated by a client device accessing a messaging system. For example, as described with reference to FIG. 3, client device 350 may display workspace GUI 2400. A messaging server 320 may retrieve workspace GUI metadata from messaging database 310 and/or provide this workspace GUI metadata to client device 350. Client device 350 may then use this metadata to generate workspace GUI 2400. In an embodiment, a messaging server 320 may generate workspace GUI 2400 and/or stream access to workspace GUI 2400 to client device 350.

In an embodiment, workspace GUI 2400 may include a workspace index 2410, a workspace identifier 2420, a private message chat panel 2430, a team chat panel 2440, and/or a division chat panel 2450. In an embodiment, a user (for example, a user 130 as described with reference to FIG. 1A-1C) may view workspace GUI 2400 and/or manipulate workspace GUI 2400 to access multiple workspaces, chat panels, and communication channels. A workspace may comprise one or more private message chat panels 2430, team chat panels 2440, and/or division chat panels 2450. Users may send and/or receive messages via these chat panels. By utilizing a workspace, users are able to select different chat panels to view, select different types of chat panels to view, arrange selected chat panels in a particular layout, and/or preserve the layout of chat panels for later viewing. In this manner, users may arrange or organize chat panels into user-specified workspaces so that users can access one or more chat panels simultaneously.

Similarly, users will be able to preserve a specific configuration of chat panels for later use so that users need not create a new arrangement or workspace each time a user accesses the messaging system. The messaging system may receive configuration data from a client device and/or store the configuration data in a database for later retrieval and delivery to the client device.

In an embodiment, when creating a workspace and/or saving a workspace, a user may specify a workspace identifier 2420 associated with the created workspace. Workspace identifier 2420 may be a title, symbol, and/or other user-selected identifier. In an embodiment, the messaging system may provide a workspace identifier 2420 when a user initiates the workspace creation process. For example, the messaging system may provide a default workspace identifier, such as, "Workspace A." The messaging system may continue providing identifiers alphabetically or numerically as new workspaces are created.

Within a created workspace, a user may select one or more private message chat panels 2430, team chat panels 2440, and/or division chat panels 2450 to view. With this selection, a user is able to preserve a layout of conversations or messages. In an embodiment, this layout allows users to view different types of chat panels simultaneously. Using a workspace may allow a user to quickly switch between chat panels or communication channels. For example, a user may create a workspace having a private message chat panel 2430 with another user along with a team chat panel 2440 and/or a division chat panel 2450 within the same GUI view. These chat panels may preserve messages exchanged when not using workspaces. For example, these chat panels may preserve messages exchanged in panels similar to those described with respect to FIG. 7, FIG. 8, FIG. 10, FIG. 18-FIG. 23. In this manner, users may utilize single chat panels and/or utilize chat panels without using a workspace configuration. When creating a workspace, the previously exchanged messages will appear in the workspace configuration. This preserving of messages may allow a user to generate multiple workspaces with chat panel messages being preserved between the multiple workspaces.

In an embodiment, the messaging system may pre-populate a created workspace. For example, the messaging system may utilize usage statistics and arrange a workspace with the most frequently used chat panels. After pre-populating a workspace, a user may edit the pre-populated chat panels to add and/or remove other chat panels. In an embodiment, a user may indicate whether the user wishes for the messaging system to pre-populate a workspace or if the user wishes for the messaging system to provide a blank workspace without chat panels. The messaging system may generate a workspace according to user preference data maintained in a messaging database.

In addition to selecting different chat panels to arrange in a workspace, a user may also determine a configuration of chat panels within a workspace. For example, the user may interact with workspace GUI 2400 and utilize a drag and drop interaction to move the chat panels. In an embodiment, the user may organize the chat panels using an ordered list. The messaging system may preserve this ordering based on metadata exchanged between a client device displaying workspace GUI 2400 and a messaging server. When a user accesses workspace GUI 2400, the messaging system may transmit metadata to the client device commanding the client device to display workspace GUI 2400 and the preserved workspace arrangement of chat panels. The client device may display workspace GUI 2400 via an application installed on the client device and/or an Internet browser accessing a website instance of workspace GUI 2400.

In addition to preserving a workspace arrangement, the messaging system may present a workspace index 2410 in workspace GUI 2400. Workspace index 2410 may be a list of workspaces saved or preserved by a user. Users accessing workspace GUI 2400 may select between different workspaces. In an embodiment, a client device displaying workspace GUI 2400 may transmit a user selection to the messaging system instantiating the chat panels. The messaging system may then return metadata regarding the newly selected workspace so that the client device may update workspace GUI 2400 to display the chat panels associated with the newly selected workspace. Similarly, the messaging system may return GUI layout information so that the previously saved arrangement of chat panels may be recreated. In an embodiment, a client device may locally store workspace information so that the client device updates workspace GUI 2400 based on a workspace selection.

FIG. 25 is a diagram that illustrates a GUI 2500 for configuring workspace communication channels, according to an embodiment. A client device may display GUI 2500 when a user attempts to create a new workspace and/or when a user wishes to edit the available chat panels in an existing workspace. In an embodiment, a client device may display GUI 2500 by default when a new workspace is created. In an embodiment, a user may interact with GUI 2500 to provide commands to a messaging system and to indicate the chat panels that the user wishes to associate with the designated workspace.

GUI 2500 may include a workspace index 2510. Workspace index 2510 may display a list of saved workspaces. In an embodiment, the messaging system and/or the client device may update workspace index 2510 with the title of a newly created workspace. For example, when GUI 2500 displays a workspace identifier 2520, such as "Workspace D," the client device may update workspace index 2510 to also include "Workspace D" in the list of workspaces. Workspace index 2510 may associate links and/or commands with each listed workspace such that users may select between the workspaces.

When accessing GUI 2500 to create a new workspace or to edit an existing workspace, a user may select chat panels to be associated with and/or displayed in the workspace. For example, the user may toggle a company chat panel option 2530, one or more division chat panel options 2540, one or more team chat panel options 2550, and/or one or more private message chat panel options 2560. Using these elements of GUI 2500, a user may specify the desired chat panels to be displayed on a workspace GUI such as workspace GUI 2400. In an embodiment, the chat panel options 2530, 2540, 2550, and 2560 may be GUI switches that indicate whether an option has been selected. For example, the chat panel options 2530, 2540, 2550, and 2560 may be binary sliders that may utilize different colors or symbols to denote a selection.

In an embodiment, GUI 2500 may include a search feature and/or an input feature to allow a user to add a chat panel without using a chat panel option. For example, a user may input text and/or a drop-down menu may allow a user to select to add a chat panel.

When a user has selected the desired chat panels, the user may select an option on GUI 2500 to save the selection. In an embodiment, closing GUI 2500 or selecting a different display may cause the client device to save the selection without requiring a specific command from a user to save the selection. In an embodiment, the client device may locally store metadata indicate the generation of the workspace and/or the selection of chat panels associated with the workspace. In an embodiment, the client device may transmit workspace identifier 2520 and/or selected chat panel options 2530, 2540, 2550, and 2560 to a messaging system. The messaging system may then store this information as metadata for use at a later time. When a user requests access to the workspace, the messaging system may retrieve the metadata and generate the workspace to display the previously selected chat panels. The messaging system may then facilitate messages sent and/or received via the communication channels associated with the chat panels.

By saving the metadata, embodiments offer several technical improvements. For example, saving workspace metadata allows a messaging system to avoid unnecessary processing steps to recreate a workspace. Utilizing layout metadata may allow the messaging system to avoid steps such as placing a chat panel and/or instantiating a chat panel from a state without populated messages. In an embodiment, the metadata may allow the messaging system to preload messages of a chat panel. In an embodiment, the metadata may allow the messaging system to avoid the generation of duplicative chat panels. For example, the metadata may allow for a chat panel and chat panel messages to be preserved among different workspaces. This configuration allows the messaging system to avoid wasteful processing in regenerating chat panels.

FIG. 26 is a diagram that illustrates a GUI 2600 for configuring a workspace layout, according to an embodiment. GUI 2600 may display a workspace 2610 which may include one or more chat panels. The chat panel may include different types of chat panels, such as, for example private message chat panels, team chat panels, team chat panels, and/or division chat panels. Workspace 2610 may include a starting configuration of chat panels. For example, the chat panels may be arranged in rows and columns. In an embodiment, a user may arrange chat panels in a free form manner without strict delineations. The client device and/or messaging system may then store location information associated with the chat panels to create the arrangement at a later time. The location information for a chat panel may be a coordinate relative to another chat panel, an absolute location value, and/or a combination. In an embodiment, the client device and/or messaging system may store data related to the sizing of a chat panel. This sizing data may be relative and/or absolute.

In an embodiment, GUI 2600 may provide layout menu 2620 which may include one or more selectable layouts 2630. Layout menu 2620 may initially be a hidden element on GUI 2600. A user may select an icon and/or provide a command to cause a client device to display layout menu 2620. For example, a user may be sending or receiving messages via the chat panels of workspace 2610. The user may then choose to display layout menu 2620 to alter the configuration of the chat panels.

In an embodiment, layout menu 2620 may include one or more selectable layouts 2630. Layouts 2630 may include one or more pre-configured arrangements of chat panels. A user may select a layout 2630, causing workspace 2610 to arrange the chat panels according to the selected layout 2630. In an embodiment, this selection may inform the client device and/or the messaging system about the location and/or size of the chat panels. For example, a layout 2630 may indicate the number of rows and columns to be used, such as two rows by four columns. If the client device is generating workspace 2610, the client device is able to arrange the chat panels according to the chosen layout 2630. If a user chooses another layout 2630, the client device may adjust the chat panels according to the newly selected layout 2630.

In an embodiment, the client device may size the chat panels according to a selected layout 2630 and/or the size of the display screen showing workspace 2610. For example, the client device may divide a predetermined area to display the chat panels based on the size of the display screen. In an embodiment, this division may occur based on the number of chat panels selected to be displayed. For example, a user may select to view eight chat panels using two rows and four columns. Using a display screen ratio of 1600 pixels by 900 pixels, the client device may divide the total number of pixels by the selected layout 2630. In an embodiment, to display eight chat panels using two rows and four columns, each chat panel may be sized as being 400 pixels by 450 pixels. A skilled artisan may adjust these ratios and/or generate formulas that include pixel space for margins or space around a chat panel. In an embodiment, the client device may transmit metadata indicating a chosen layout 2630 to the messaging system. The messaging system may then store the chosen layout 2630 metadata as a parameter of workspace 2610.

FIG. 27 is a diagram that illustrates GUI 2700 for configuring a workspace index, according to an embodiment. In an embodiment, a user may utilize GUI 2700 to configure a workspace index listing one or more generated workspaces. For example, if a user is using workspace 2710, the user may choose to view workspace index menu 2730. Workspace index menu 2730 may include one or more configurations options 2720 concerning how a particular workspace 2710 may be presented relative to other workspaces. For example, a particular workspace 2710 may be presented in a list or a workspace index allowing user to select between listed workspaces. Workspace index menu 2730 may include configurations options 2720 allowing users to hide and/or display a particular workspace on the workspace index. In an embodiment, a configuration option 2720 may allow a user to delete a workspace. For example, if workspace index menu 2730 is overlaid on top of workspace 2710, a user may choose to delete workspace 2710.

In an embodiment, a configuration option 2720 may include the choice to display a message counter. The message counter may be a counter for a particular chat panel indicating the number of unseen and/or unread messages that have been received. In an embodiment, the client device may track the number of messages received and/or the messages that a user has seen based on a user viewing a GUI display and/or selecting a particular chat panel.

In an embodiment, enabling a message counter as a configuration 2720 may cause the client device and/or the messaging system to aggregate the number of unseen and/or unread messages among the chat panels of a workspace. For example, if a first chat panel includes two unseen messages and a second chat panel includes three unseen messages, a workspace index may indicate that the workspace that includes the first and second chat panel includes five unseen messages. This indication may occur at a workspace index. In this manner, a user may be able to view the number of unseen messages among multiple workspaces. In an embodiment, because multiple workspaces may include the same chat panel, reading the messages of the chat panel in a first workspace may decrease the number of unread messages in a second workspace.

FIG. 28 is a flowchart that illustrates a method 2800 for generating a workspace, according to an embodiment. Method 2800 can be performed by processing logic that can comprise hardware (e.g., circuitry, dedicated logic, programmable logic, microcode, etc.), or software (e.g., instructions executing on a processing device). It is to be appreciated that not all steps may be needed to perform the disclosure provided herein. Further, some of the steps may be performed simultaneously, or in a different order than shown in FIG. 28, as will be understood by a person of ordinary skill in the art. Method 2800 allows for the generation of a workspace.

At step 2810, a messaging system receives a workspace identifier from a client. The client may be a client device displaying a messaging GUI. The messaging GUI may be displaying using an Internet browser and/or a software program or application installed on the client device. A user may interact with the GUI and choose to create a new workspace and/or to view a previously created workspace. In response to receiving a workspace command from a user, the client device may transmit a workspace identifier to the messaging system. The workspace identifier may be data representative of the workspace designated by the user. In an embodiment, if the user is creating a new workspace, the workspace identifier may include a title of the workspace, desired chat panels, and/or communication channels that the user wishes to associated with the workspace. If the user is accessing a previously created workspace, the workspace identifier may be the title or index of the workspace or a resource locator indicative of the workspace. At step 2810, the messaging receiver may receive the workspace identifier from the client.

At step 2820, the messaging system retrieves workspace GUI metadata corresponding to the received workspace identifier from a database. In an embodiment, the messaging system may receive the workspace identifier at a messaging server. The messaging server may then retrieve workspace GUI metadata from a messaging database as described with respect to FIG. 3. The workspace GUI metadata corresponding to the workspace identifier may include the chat panels associated with the workspace identifier and/or layout metadata. The layout metadata may be utilized by the messaging system and/or the client device to display a GUI that allows users to send and receive messages.

In an embodiment, if the user is creating a new workspace, at step 2820, the messaging system may determine that workspace GUI metadata does not exist in the database when attempting to retrieve the metadata. In this embodiment, the messaging system may utilize default workspace GUI metadata. This default workspace GUI metadata may be used by the messaging system and/or the client to create a template workspace.

At step 2830, the messaging system generates one or more communication channels according to the workspace GUI metadata. The one or more communication channels may correspond to one or more chat panels identified by the workspace GUI metadata. For example, the workspace GUI metadata corresponding to the workspace identifier may indicate that the workspace includes three chat panels: one private message chat panel with User A, one team chat panel with Team B, and one division chat panel with Division C. Using this information, the messaging system may initialize the routing of messages to each chat panel as communication channels. For example, a communication channel may be the message communication path between the client and User A via messaging servers and messaging database of the messaging system. Similarly, another communication channel may be the communication path between the client and other users subscribed to the Team B chat panel. By establishing the communication channels, the messaging system may facilitate the exchange of messages based on the various chat panels associated with the workspace identified by the workspace identifier.

In an embodiment, if the client is generating a new workspace that has not been previously created, at step 2830, the messaging system may generate one or more communication channels by storing the associations of the client with the chat panels selected to be associated with the workspace.

At step 2840, the messaging system transmits the workspace GUI metadata to the client. In an embodiment, transmitting the workspace GUI metadata to the client allows the client to generate a workspace GUI display. The workspace GUI display may generate chat panels on a display screen. The chat panels may correspond to the communication channels specified by the workspace GUI metadata. In an embodiment, the workspace GUI metadata may include layout information corresponding to the arrangement of the chat panels. This layout information may include chat panel location information and/or chat panel size information.

In an embodiment, the messaging system may generate a workspace GUI representation and transmit this representation to the client. For example, this configuration may include situations where the client utilizes a remote desktop or virtual computer to access the messaging system. At step 2840, the messaging system may transmit a GUI display as workspace GUI metadata to the client.

At step 2850, the messaging system facilitates access to the one or more communication channels via a workspace GUI generated using the workspace GUI metadata. In an embodiment, the client may generate and/or display the workspace GUI using the workspace GUI metadata. The workspace GUI may display the chat panels associated with the workspace. The messaging system is able to receive messages transmitted from the client and recognize the chat panel from where the message was sent. Using this information, the messaging system may transmit the message to other subscribers of the chat panel.

For example, if the user sends a message to a Team A using the Team A chat panel, the client may transmit this message to the messaging system for delivery. The messaging system may receive the message at a messaging server and/or route the message to other subscribers of Team A. The messaging system may transmit the message to another messaging server and/or utilizing a messaging database to deliver the message. Similarly, when a member of Team A transmits a message, the messaging system may route this message to the client. The client may display this message within workspaces that include the Team A chat panel.

FIG. 29 is a flowchart that illustrates a method 2900 for monitoring message content, according to an embodiment. Method 2900 can be performed by processing logic that can comprise hardware (e.g., circuitry, dedicated logic, programmable logic, microcode, etc.), or software (e.g., instructions executing on a processing device). It is to be appreciated that not all steps may be needed to perform the disclosure provided herein. Further, some of the steps may be performed simultaneously, or in a different order than shown in FIG. 29, as will be understood by a person of ordinary skill in the art. Method 2900 allows for the monitoring of content in a messaging system.

At step 2910, a messaging system may facilitate access to a communication channel. For example, the messaging system may be connected to a client. The client may transmit messages to the messaging system to be delivered to other clients. Similarly, the messaging system may route messages received from other clients. These messages may be sent from or received by chat panels display in various clients. In this manner, the messaging system may facilitate access to a communication channel between clients using chat panels.

At step 2920, the messaging system may receive a message from a first client using the communication channel. For example, the communication channel may be a private message channel between two users. In an embodiment, the communication channel may be a team channel between a user and other members of a team. At step 2920, a first client may transmit a message from a first client using a chat panel. Based on the chat panel used, the messaging system may recognize an identifier included in the message to determine the intended recipients of the message. The messaging system may also analyze the content of the message.

At step 2930, after receiving a message, the messaging system compares symbols of the message with symbols of a flagged content list. The flagged content list may be a list of content defined by an administrator of the messaging system. Using the flagged content list, an administrator may monitor the content of messages to determine if any flagged content appears in messages. For example, the flagged content list may include words such as profanity, words related to sexual harassment, hate speech, personal information, confidential information or keywords, and/or other content that an administrator may define.

In an embodiment, the flagged content list may also include symbols or structures of symbols. For example, the flagged content list may recognize a ten digit structure of numbers (e.g., 123-456-7890) as a phone number. Similarly, the flagged content list may recognize a social security number or credit card number. In an embodiment, the flagged content list may also compare metadata in data or files transmitted via message. For example, the flagged content list may detect a metadata indicating the confidential nature of files. In this manner, the messaging system may detect messages for regulatory purposes and/or may detect messages transmitting sensitive information. Further, the comparison of symbols at step 2930 allows the messaging system to monitor more than words and to also monitor the content and/or structure of the messages. When the messaging system receives a message, the messaging system may extract and compare the symbols associated with the message to determine if any of the symbols match the symbols of the flagged content list.

At step 2940, the messaging system determines if any of the symbols of the message match any of the symbols of the flagged content list. If no symbols of the message match, the messaging system may execute step 2950 and may deliver the message to a second client subscribed to the communication channel. In an embodiment, the second client may be a user if the communication channel is a private message channel. In an embodiment, the second client may be a user that is a member of a team. In an embodiment, the messaging system may generate a record of the message even if no matching symbols exist.

If the messaging system determines that a symbol of the message matches a symbol of the flagged content list, the messaging system, at step 2960, generates a record of the message indicating a matching symbol. In an embodiment, the messaging system may tag the message using metadata so that the message includes an identifier of flagged content. In an embodiment, the messaging system may generate a copy of the message and/or store the message in a separate location in database memory indicating the detection of flagged content. The messaging system may store metadata associated with the message such as the user account that sent the message, the time when the message was sent, and/or location information concerning the geographical source of the message.

In an embodiment, the messaging system may compile statistics related to flagged content. For example, the messaging system may identify repeat instances of certain words to identify harassment. The messaging system may also identify the repeated transmission of personal information and/or confidential data. In an embodiment, the messaging system may edit messages to remove the flagged content. For example, if a message includes profanity, the messaging system may deliver the message with asterisks in place of the profane words.

Similarly, the messaging system may prevent the delivery of numerical information such as social security numbers or credit card numbers. In an embodiment, the messaging system may maintain personal user information associated with a user in the flagged content list so that when a user supplies personal information, the messaging system is able to prevent the transmission of the personal information. For example, the messaging system may recognize the date of birth or an address associated with a user of the first client. When the messaging system receives a message from the first client containing this personal information, the messaging system is able to prevent the transmission of the message and/or edit the message to remove the personal information prior to delivering the message.

At step 2970, the messaging system may transmit a flagged content notification to an administrator client. For example, a compliance officer may have access the messaging system, and the messaging system may notify the compliance officer when flagged content is detected in a message. In an embodiment, an administrator of the messaging system may define multiple tiers of security. For example, the flagged content list may identify a first tier of flagged content requiring review by an administrator prior to delivery of the message to a second client. The flagged content list may identify a second tier of flagged content that may cause the messaging system to record the message without requiring review by an administrator.

In an embodiment, after the execution of step 2960 and/or step 2970, the messaging system may deliver the message to a second client subscribed to the communication channel at step 2950. This message may be edited from the original message to remove the flagged content. This message may be also have been approved by an administrator prior to transmission. In an embodiment, after the execution of step 2960 and/or step 2970, the messaging system may not deliver the message based on the administrator defined rules of the messaging system and/or the flagged content list.

Figure 30:
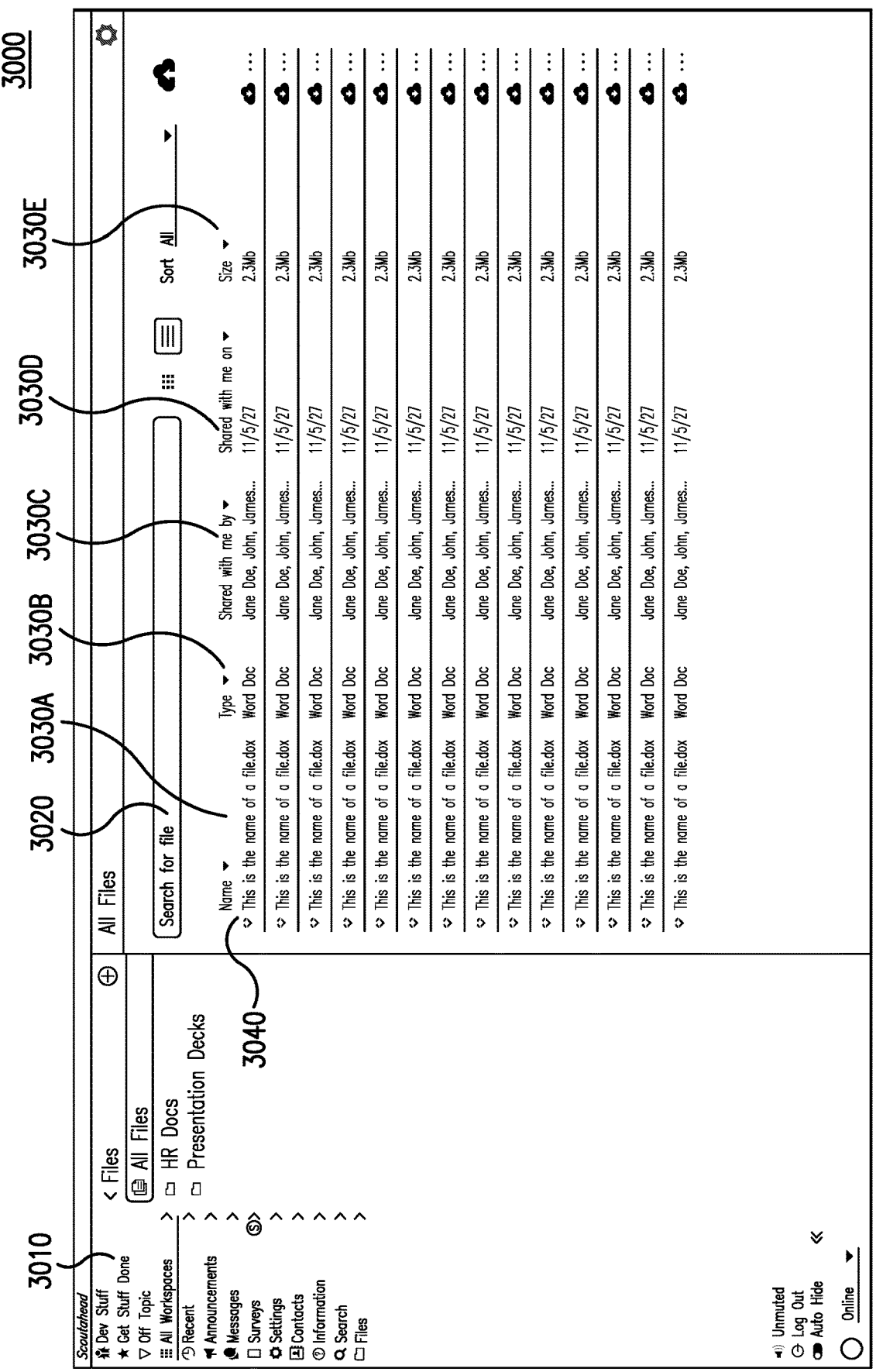
FIG. 30 is a diagram that illustrates a graphical user interface for managing files, according to an embodiment.

FIG. 30 is a diagram that illustrates a GUI 3000 for managing files, according to an embodiment. In an embodiment, a user may utilize GUI 3000 in conjunction with the GUIs described in FIGS. 7-15 and 17-27. A user may access GUI 3000 to view and/or edit files managed by a messaging system. The user may upload new files to the messaging system and/or export files stored by the messaging system to a local computing device. A user may also utilize GUI 3000 to send file links 3040 to other users so that the other users can access the files stored by the messaging system. In an embodiment, the messaging system may allow and/or restrict access to stored files based on whether a client is accessing the file via the messaging system or via a generated link.

In an embodiment, a user may view the files stored in the messaging system via a selection using a hierarchical messaging interface 3010. The user may select a GUI button corresponding to a file management interface. Based on this selection, the messaging system may cause the user client device to display a list of available files. In an embodiment, GUI 3000 may display a search bar 3020. Search bar 3020 may allow a user to search for a specific file. In an embodiment, the user may input the name of the file, a description of the file, the file type, an author, editor, or uploader of the file, and/or the name of the user that provided the file to the user.

In an embodiment, GUI 3000 may display a list of files and allow the user to sort the list via sort buttons 3030. For example, sort button 3030A may sort the list of files by file name. Sort button 3030B may sort the list of files by file type. Sort button 3030C may sort the list of files by the user who shared the file. Sort button 3030D may sort the list of files by the date or time the file was shared. Sort button 3030E may sort the list of files by file size.

In an embodiment, a user may utilize chat panels in conjunction with GUI 3000 to deliver files. For example, a user may use a drag and drop interaction with GUI 3000 to deliver a file link 3040 to another user. A user may press or hold file link 3040, which may allow the user to drag file link 3040 into a chat panel. A chat panel may appear underneath the selection if the user was previously viewing a chat panel. In an embodiment, chat panels may appear in hierarchical messaging interface 3010, allowing a user to drag file link 3040 into the chat panel. Based on this interaction, the messaging system may deliver file link 3040 or the file itself to subscribers of the chat panel. When a user receives file link 3040, the user may access file link 3040 to retrieve and/or view the associated file. In an embodiment where the chat panel includes an email thread, the messaging system may send file link 3040 to user of the messaging system while sending the file itself as an attachment to an email to email addresses external to the messaging system. In an embodiment, the messaging system may send a link such as a URL to allow the email recipient to download the file. Via integration with the messaging system, GUI 3000 may allow a user to quickly locate a file and share access to the file to users of the messaging system as well as users external to the messaging system. GUI 3000 allows for file management integration with chat panels. This integration allows users to quickly deliver files to the subscribers of the chat panels without needing to access separate programs for file delivery.

Based on the teachings contained in this disclosure, it will be apparent to persons skilled in the relevant art(s) how to make and use embodiments using data processing devices, computer systems and/or computer architectures other than that shown in FIG. 3. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method, comprising:
generating a workspace graphical user interface (GUI) with a plurality of chat panels and a GUI object to search for files within the plurality of chat panels, wherein the plurality of chat panels include division, team, and private message chat panels;
receiving, via the GUI object, a search term corresponding to content of the plurality of chat panels;
identifying one or more chat panels from the plurality of chat panels including the content corresponding to the search term;
extracting, from the one or more chat panels, one or more file designations corresponding to the content corresponding to the search term, wherein the content was shared within the one or more chat panels; and
updating the workspace GUI to display the one or more file designations corresponding to the content, wherein the workspace GUI identifies a correspondence between the one or more file designations, the one or more chat panels from which the one or more file designations were extracted, and an identification of one or more users who shared files corresponding to the one or more file designations in the one or more chat panels.

2. The computer-implemented method of claim 1, wherein the content is a message communicated within the one or more chat panels.

3. The computer-implemented method of claim 1, wherein the content is a document file communicated within the one or more chat panels.

4. The computer-implemented method of claim 1, wherein the content is a video communicated within the one or more chat panels.

5. The computer-implemented method of claim 1, further comprising:
   updating the workspace GUI to display a list of files corresponding to the search term;
   receiving, via the workspace GUI, a user selection to filter the list of files based on a selected chat panel of the plurality of chat panels; and
   updating the workspace GUI to display a filtered list of files corresponding to the selected chat panel.

6. The computer-implemented method of claim 1, further comprising:
   updating the workspace GUI to display a list of files corresponding to the search term;
   receiving, via the workspace GUI, a user interaction dragging a file icon in the list of files into a particular chat panel; and
   transmitting a link to a file corresponding to the file icon to one or more users corresponding to the particular chat panel.

7. The computer-implemented method of claim 6, wherein the one or more users corresponding to the particular chat panel includes chat panel users and email users, the transmitting further comprising:
   transmitting the link to the file such that the link appears in a chat panel corresponding to the chat panel users; and
   transmitting the link in an email message to the email users.

8. The computer-implemented method of claim 1, further comprising:
   receiving a selection of a particular chat panel from the plurality of chat panels;
   receiving a second search term;
   identifying second content corresponding to the second search term within the particular chat panel; and
   displaying, on the workspace GUI, the second content.

9. A system, comprising:
   a messaging database; and
   a messaging server configured to:
      generate a workspace graphical user interface (GUI) with a plurality of chat panels and a GUI object to search for files within the plurality of chat panels, wherein the plurality of chat panels include division, team, and private message chat panels;
      receive, via the GUI object, a search term corresponding to content of the plurality of chat panels;
      identify one or more chat panels from the plurality of chat panels including the content corresponding to the search term;
      extracting, from the one or more chat panels, one or more file designations corresponding to the content corresponding to the search term, wherein the content was shared within the one or more chat panels; and
      update the workspace GUI to display the one or more file designations corresponding to the content, wherein the workspace GUI identifies a correspondence between the one or more file designations, the one or more chat panels from which the one or more file designations were extracted, and an identification of one or more users who shared files corresponding to the one or more file designations in the one or more chat panels.

10. The system of claim 9, wherein the content is a message communicated within the one or more chat panels.

11. The system of claim 9, wherein the content is a document file communicated within the one or more chat panels.

12. The system of claim 9, wherein the content is a video communicated within the one or more chat panels.

13. The system of claim 9, wherein the messaging server is further configured to:
   update the workspace GUI to display a list of files corresponding to the search term;
   receive, via the workspace GUI, a user selection to filter the list of files based on a selected chat panel of the plurality of chat panels; and
   update the workspace GUI to display a filtered list of files corresponding to the selected chat panel.

14. The system of claim 9, wherein the messaging server is further configured to:
   update the workspace GUI to display a list of files corresponding to the search term;
   receive, via the workspace GUI, a user interaction dragging a file icon in the list of files into a particular chat panel; and
   transmit a link to a file corresponding to the file icon to one or more users corresponding to the particular chat panel.

15. The system of claim 14, wherein the one or more users corresponding to the particular chat panel includes chat panel users and email users and wherein to transmit the link, the messaging server is further configured to:
   transmit the link to the file such that the link appears in a chat panel corresponding to the chat panel users; and
   transmit the link in an email message to the email users.

16. The system of claim 9, wherein the messaging server is further configured to:
   receive a selection of a particular chat panel from the plurality of chat panels;
   receive a second search term;
   identify second content corresponding to the second search term within the particular chat panel; and
   display, on the workspace GUI, the second content.

17. A non-transitory computer-readable device having instructions stored thereon that, when executed by at least one computing device, causes the at least one computing device to perform operations comprising:
   generating a workspace graphical user interface (GUI) with a plurality of chat panels and a GUI object to search for files within the plurality of chat panels, wherein the plurality of chat panels include division, team, and private message chat panels;
   receiving, via the GUI object, a search term corresponding to content of the plurality of chat panels;
   identifying one or more chat panels from the plurality of chat panels including the content corresponding to the search term;
   extracting, from the one or more chat panels, one or more file designations corresponding to the content corresponding to the search term, wherein the content was shared within the one or more chat panels; and
   updating the workspace GUI to display the one or more file designations corresponding to the content, wherein the workspace GUI identifies a correspondence between the one or more file designations, the one or more chat panels from which the one or more file designations were extracted, and an identification of one or more users who shared files corresponding to the one or more file designations in the one or more chat panels.

18. The non-transitory computer-readable device of claim 17, wherein the content is a message, document file, or video communicated within the one or more chat panels.

19. The non-transitory computer-readable device of claim 17, the operations further comprising:
- updating the workspace GUI to display a list of files corresponding to the search term;
- receiving, via the workspace GUI, a user selection to filter the list of files based on a selected chat panel of the plurality of chat panels; and
- updating the workspace GUI to display a filtered list of files corresponding to the selected chat panel.

20. The non-transitory computer-readable device of claim 17, the operations further comprising:
- updating the workspace GUI to display a list of files corresponding to the search term;
- receiving, via the workspace GUI, a user interaction dragging a file icon in the list of files into a particular chat panel; and
- transmitting a link to a file corresponding to the file icon to chat panel users and email users corresponding to the particular chat panel, wherein transmitting the link further comprises:
  - transmitting the link to the file such that the link appears in a chat panel corresponding to the chat panel users; and
  - transmitting the link in an email message to the email users.

* * * * *